US008687636B1

(12) United States Patent
Sivan et al.

(10) Patent No.: US 8,687,636 B1
(45) Date of Patent: Apr. 1, 2014

(54) EXTENDED POLICY CONTROL LIST KEYS HAVING BACKWARDS COMPATIBILITY

(75) Inventors: Ehud Sivan, Zichron Ya'Akov (IL); Uri Safrai, Haifa (IL)

(73) Assignee: Marvell Israel (M.I.S.L) Ltd., Yokneam (IL)

(*) Notice: Subject to any disclaimer, the term of this patent is extended or adjusted under 35 U.S.C. 154(b) by 308 days.

(21) Appl. No.: 13/150,991

(22) Filed: Jun. 1, 2011

Related U.S. Application Data

(60) Provisional application No. 61/350,777, filed on Jun. 2, 2010.

(51) Int. Cl.
*H04L 12/28* (2006.01)

(52) U.S. Cl.
USPC .................. 370/392; 370/395.53; 726/13

(58) Field of Classification Search
None
See application file for complete search history.

(56) References Cited

U.S. PATENT DOCUMENTS

| | | | |
|---|---|---|---|
| 6,658,002 B1 * | 12/2003 | Ross et al. ............ | 370/392 |
| 7,426,608 B1 * | 9/2008 | Kao ....................... | 711/108 |
| 7,796,594 B2 | 9/2010 | Melman et al. | |
| 7,861,291 B2 * | 12/2010 | Kramer et al. ........ | 726/13 |
| 8,031,709 B2 * | 10/2011 | Alexander, Jr. ...... | 370/389 |
| 8,094,659 B1 * | 1/2012 | Arad ..................... | 370/392 |
| 2003/0108043 A1 * | 6/2003 | Liao ..................... | 370/392 |
| 2005/0018682 A1 * | 1/2005 | Ferguson et al. .... | 370/392 |
| 2006/0187923 A1 * | 8/2006 | Yu ........................ | 370/389 |
| 2006/0294297 A1 * | 12/2006 | Gupta ................... | 711/108 |
| 2008/0232374 A1 * | 9/2008 | Kopelman et al. ... | 370/392 |
| 2011/0134925 A1 | 6/2011 | Safrai et al. | |
| 2012/0033670 A1 * | 2/2012 | Olakangil ............. | 370/392 |
| 2012/0106354 A1 * | 5/2012 | Pleshek et al. ....... | 370/241 |

* cited by examiner

*Primary Examiner* — Michael J Moore, Jr.

(57) ABSTRACT

Techniques for processing packets in a network device include using a configuration table to determine a key corresponding to a packet. The configuration table may be indexed based on contents of a field of the packet (e.g., e/port or e/VLAN) to find a corresponding entry indicating a key format. When a key extension indicator has a first pre-determined value, a key extension field is added to the key format, and when the key extension indicator has a second pre-determined value, the key extension indicator is excluded from the key format. The populated key format or key (including any key extension field, if so determined) is used to determine a processing action for the packet. Key extension indicators support compatibility with non-legacy devices that utilize extended fields in packets, and with legacy devices. Embodiments of methods and network devices that support standard and extended keys are disclosed.

24 Claims, 6 Drawing Sheets

EXTENDED POLICY CONTROL LIST KEYS HAVING BACKWARDS COMPATIBILITY

CROSS-REFERENCES TO RELATED APPLICATIONS

The present application claims the benefit of U.S. Provisional Application No. 61/350,777 entitled "Extended PCL Keys for TCAM having Full Backwards Compatibility," which was filed on Jun. 2, 2010, the entire disclosure of which is hereby incorporated by reference herein.

The present application is related to U.S. application Ser. No. 12/938,116 entitled "Switching Apparatus and Method Based on Virtual Interfaces," which was filed on Nov. 2, 2010, the entire disclosure of which is hereby incorporated by reference herein.

FIELD OF THE DISCLOSURE

The present disclosure relates generally to communication networks and, more particularly, to network switching devices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Some networking applications require switching between a high number of ports. For example, a typical data center includes a large number of servers, and switches to communicatively couple the servers to outside network connections, such as backbone network links. As another example, a high-volume website server system (server farm) can include a large number of web servers, and switches to communicatively couple the web servers to backbone network links.

In such applications, switching systems capable of switching between a high number of ports are utilized so that traffic from a backbone network line can be routed to a large number of servers, and vice versa. Such switching systems can include a large number of switches, and each switch can be capable of switching between several ports.

With bridge devices, operational characteristics are often defined by various standards such as the IEEE 802.1Q standard or others promulgated by the International Engineering Task Force (IETF), for example. In some instances, Layer-2 Virtual Private Network (L2VPN) technologies are utilized to implement a logical bridge on top of a Layer-2 or Layer-3 infrastructure network; examples of such technologies include VPLS (Virtual Private Local Area Network (LAN) Service), MAC-in-MAC, and certain emerging wireless local area network (WLAN) standards. "MAC-in-MAC" (sometimes referred to as "M-in-M") refers to the IEEE 802.1ah Standard, which defines an Ethernet frame encapsulation that provides other tags so that routing in the service provider domain need not be based on the MAC address in the Ethernet frame. In this way, the customer and service provider domains can be separated.

SUMMARY

In an embodiment, a method of processing a packet in a network device includes determining a key corresponding to the packet. The key corresponding to the packet is determined based on information included in the packet and based on a value of a key extension indicator stored in a memory of the network device. When the value of the key extension indicator is a first value, the method includes determining that the key includes both a standard field and an extension field. When the value of the key extension indicator is a second value, the method includes determining that the key includes the standard field and excludes the extension field. The method further includes determining, based on the key, a processing action for the packet, and processing the packet using the processing action.

In another embodiment, a network device for processing packets includes a plurality of physical ports and a forwarding engine coupled to the plurality of physical ports. The forwarding engine includes a configuration table that defines correspondences between at least one of i) ports and key formats, or ii) virtual domains and key formats. The forwarding engine further includes a policy engine that is configured to determine, using the configuration table and based on information included in a packet that corresponds to a particular port and/or virtual domain, a key format corresponding to the packet. When a value of a key extension indicator stored in the configuration table is a first value, the key format includes both a standard field and an extension field. When the value of the key extension indicator is a second value, the key format includes the standard field and excludes the extension field. The policy engine is further configured to populate the key format based on the information included in the packet to form a key. The policy engine is additionally configured to determine, based on the key, a processing action for the packet. The forwarding engine is configured to process the packet using the processing action.

In yet another embodiment, a method of processing packets in a network device includes accessing, using information included in a packet received by the network device, a configuration table, and determining, using the configuration table, a key format and a value of a key extension indicator corresponding to the information included in the packet. The method also includes populating a first field of the key format with at least a first portion of the information included the packet. When the value of the key extension indicator corresponds to an extended logical port or to an extended virtual domain, the method includes including an extension field in the key format and populating contents of the extension field with a second portion of the information included in the packet. Additionally, the method includes determining a processing action to be performed on the packet based on the populated key format (e.g., the key), and performing the processing action on the packet.

DETAILED DESCRIPTION

Figure 1:
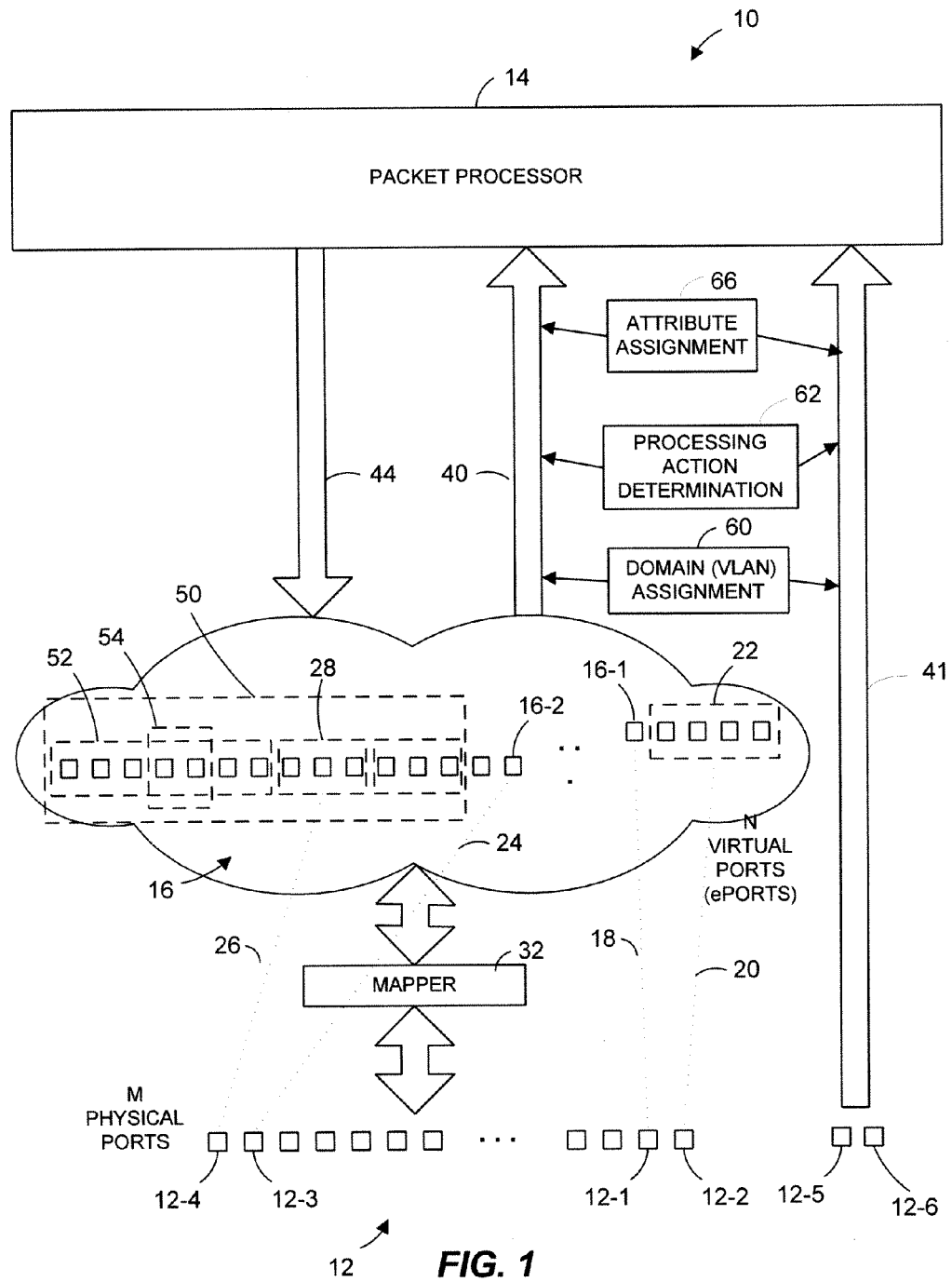
FIG. 1 is a functional diagram of an example network device configured to support extended ports, in accordance with an embodiment of the disclosure.

FIG. 1 is a functional diagram of an example network device 10 configured for processing and forwarding data units, i.e., packets, using extended ports, according to an embodiment. In some embodiments and/or implementations, the network device 10 operates as a provider edge (PE) device, and the network device 10 is sometimes referred to herein as "the PE device 10". The network device 10 includes a plurality of physical ports 12 and a packet processor 14. The packet processor 14 processes packets ingressing via physical ports 12 including one or more of i) making forwarding decisions (i.e., for egress via physical ports 12), ii) determining whether a packet should be trapped or mirrored to another processor (not shown) for further analysis, iii) determining whether a packet should be discarded, etc.

The network device 10 includes the capability of processing packets using virtual or logical ports, where a quantity of virtual or logical ports is larger than a quantity of physical ports included on the device 10, and where, for at least some of the physical ports, multiple virtual ports correspond to one physical port. The network device 10 also includes the capability to assign virtual or logical domains to the packet based on an assigned virtual or logical port, as described in more detail below.

The network device 10 includes a number M of physical ports 12, and is configured to utilize up to a number N of extended ports 16 ("eports"), where N>M. In an embodiment, eports are not physical entities, but merely logical assignments. Thus, eports are sometimes referred to herein as "virtual ports" or "logical ports."

The network device 10 is configured so that some physical ports 12 correspond to one and only one eport 16, whereas each of other physical ports 12 corresponds to more than one eport 16, in an embodiment. For example, the line 18 indicates that physical port 12-1 corresponds to eport 16-1, whereas the line 20 indicates that the physical port 12-2 corresponds to a group 22 of eports 16. Similarly, the line 24 indicates that physical port 12-3 corresponds to eport 16-2, whereas the line 26 indicates that the physical port 12-4 corresponds to a group 28 of eports 16.

A mapper 32 corresponds physical ports 12 with eports 16, if desired. For instance, the mapper 32 maps physical ports 12 to eports 16, and vice versa. For example, as illustrated in FIG. 1, the mapper 32 maps the physical port 12-1 to eport 16-1, and vice versa. Similarly, the mapper 32 maps the physical port 12-2 to the group 22 of eports 16, and vice versa. Also as illustrated in FIG. 1, the mapper 32 maps the physical port 12-3 to eport 16-2, and vice versa. Similarly, the mapper 32 maps the physical port 12-4 to the group 28 of eports 16, and vice versa. In some scenarios, a physical port does not correspond to an eport, and the physical port is not processed by the mapper 32 (e.g., physical ports 12-5 and 12-6).

The mapper 32 assigns eports 16 to ingressing packets. Thus, for example, the mapper 32 assigns traffic ingressing on the single physical port 12-2 to different eports 16 in the group 22. In an embodiment, the mapper 32 utilizes information in a packet for determining the eport 16 to which a packet should be assigned, such as header information including tunnel encapsulation information, virtual local area network (VLAN) identifiers, quality of service (QoS) indicators, etc. For instance, the mapper 32 assigns traffic ingressing on the same physical port 12-2 but corresponding to different tunnel interfaces to different eports 16 in the group 22. As another example, the mapper 32 assigns traffic ingressing on the same physical port 12-2 but having different QoS requirements to different eports 16 in the group 22. In an embodiment, the mapper 32 is configured to assign an eport 16 to an ingressing packet by including an indication of the eport 16 in a packet descriptor associated with the packet. In an embodiment, the mapper 32 includes a source eport identifier in a descriptor corresponding to the ingressing packet to indicate the eport 16 assigned to the ingressing packet.

Similarly, the mapper 32 assigns physical ports 12 to traffic egressing via eports 16. For instance, the mapper 32 assigns traffic egressing via the group 28 of eports 16 to the same physical port 12-4. As another example, the mapper 32 assigns traffic egressing via eport 16-2 to the physical port 12-3. In an embodiment, the mapper 32 is configured to assign a physical port 12 to an egressing packet by including an indication of the physical port 12 in a packet descriptor associated with the packet. In an embodiment, the mapper 32 includes an egress physical port identifier in the packet descriptor corresponding to the egressing packet to indicate the physical port 12 assigned to the egressing packet. In another embodiment, the mapper 32 directs an egressing packet, or the packet descriptor corresponding to the egressing packet, to a transmit queue memory associated with the physical port 12 assigned to the egressing packet. In an embodiment, such a transmit queue memory stores packets to be transmitted via the associated physical port 12.

Ingressing packets that have been assigned source eports (indicated by the arrow 40) are processed by the packet processor 14, and ingressing packets that have not been assigned a source eport (e.g., indicated by the arrow 41) are processed by the packet processor 14. In an embodiment, the packet processor 14 generally determines to which eport or eports 16 (egress eports) an ingressing packet 40 should be forwarded, and then assigns the determined egress eport or eports 16 to the packet. More generally, the packet processor 14 performs a packet forwarding function (e.g., bridging and/or routing) and determines to which eport/s the packet should be forwarded. In an embodiment, the packet processor 14 includes in the packet descriptor an egress eport identifier or an indicator of a set of egress eports 16 to indicate the egress eport(s) 16 assigned to the packet. Egressing packets that have been assigned egress eports (indicated by the arrow 44) are then mapped to physical ports 12 by the mapper 32.

In an embodiment, the network device 10 is configured to associate packets with virtual domains (also referred to herein as "extended virtual local area networks" or "eVLANs"), if desired. An eVLAN is similar to a typical VLAN, but corresponds to eports rather than physical ports. In an embodiment, the network device 10 is configured to handle a greater number of eVLANs than the maximum number of VLANs capable of being represented by a 12-bit VLAN identifier specified in the Institute for Electrical and Electronics Engineers (IEEE) 802.11Q Standard. VLANs and eVLANs are examples of virtual domains, and some packets processed by the network device 10 belong to a corresponding virtual domain.

In an embodiment, an eVLAN corresponds to a group of eports 16. For example, the group 22 of eports 16 is an eVLAN, in an embodiment. Similarly, the group 28 of eports 16 is another eVLAN. In FIG. 1, example eVLANs are indicated by boxes with dashed lines. An eVLAN can include eports corresponding to other eVLANs. For instance, FIG. 1 illustrates an eVLAN 50 including a plurality of eVLANs such as the eVLAN 28, an eVLAN 52, and an eVLAN 54. Additionally, an eVLAN can include a subset of eports of another eVLAN. For example, FIG. 1 illustrates the eVLAN 54 including a subset of the eports 16 of the eVLAN 52.

An VLAN assignment unit 60 assigns VLANs or eVLANs, as appropriate, to packets. For example, the VLAN assignment unit 60 assigns an eVLAN to an ingressing packet 40 based on one or more of the source eport 16 assigned to the packet 40 by the mapper 32, information in a header of the packet 40, etc., in some scenarios. In an embodiment, the VLAN assignment unit 60 assigns a VLAN to an ingressing packet 41 based on the physical port. As another example, the VLAN assignment unit 60 assigns an eVLAN to an egressing packet 44 based on one or more of the egress eport 16 assigned to the packet 44 by the packet processor 14, information in a header of the packet 44, etc., in some scenarios. In an embodiment, the VLAN assignment unit 60 assigns an eVLAN to a packet by including an eVLAN indicator in the packet descriptor corresponding to the packet.

A processing action determination unit 62 determines one or more processing actions to be performed on the packet based on whether the packet is associated with an eport (e.g., arrow 40) or is not associated with an eport (e.g., arrow 41). In an embodiment, the processing action determination unit 62 determines the one or more processing actions based on the eport or physical port assigned to the packet, and/or based on a VLAN or eVLAN assigned to the packet. In one example, the processing action determination unit 62 determines a key based on the eport to a look up table including various processing actions, such as a Ternary Content Addressable Memory (TCAM). In another example, the processing action determination unit 62 determines a key based on a VLAN associated with the packet.

An attribute assignment unit 66 assigns one or more attributes corresponding to the determined one or more processing actions for the packet. Attributes are utilized by the packet processor 14 in processing the packet, and the attributes indicate how a packet should be processed by the packet processor 14. Examples of attributes assigned by the attribute assignment unit 66 include 1) whether a packet is to be forwarded; 2) whether a packet is to be trapped, mirrored, etc.; 3) whether the media access control (MAC) source address/ingress eport are to be learned; 4) whether a spanning tree protocol is to be implemented; 5) an action to be taken when a source address of the packet is unknown to the network device 10; 6) whether Layer-3 multicast and/or broadcast mirroring is enabled for the packet; 7) whether and what type of metering should be performed (e.g., dropping a packet due to congestion or when a rate of packets in a particular flow exceeds a threshold); 8) whether and what type of measurements should be made (e.g., incrementing a counter corresponding to a particular flow, counting bytes in the packet, etc.); 9) whether and how sampling should be performed; 10) whether time stamps should be applied; etc., according to various embodiments.

Although in FIG. 1 the mapper 32, the VLAN assignment unit 60, the processing action determination unit 62, and the attribute assignment unit 66 are illustrated as being external to the packet processor 14 for the purpose of clarity, in some embodiments, one or more of the mapper 32, the VLAN assignment unit 60, the processing action determination unit 62, or the attribute assignment unit 66 are elements of the packet processor 14. Additionally, in some embodiments, each of one or more of the mapper 32, the VLAN assignment unit 60, the processing action determination unit 62, or the attribute assignment unit 66 are distributed units that assign data to a packet at different stages of processing of the packet. For example, in one embodiment, the packet processor 14 includes a processing pipeline, and each of one or more of the mapper 32, the VLAN assignment unit 60, the processing action determination unit 62, and the attribute assignment unit 66 are distributed over different stages of the processing pipeline and assign data to packets at the different stages of the pipeline.

Figure 2:
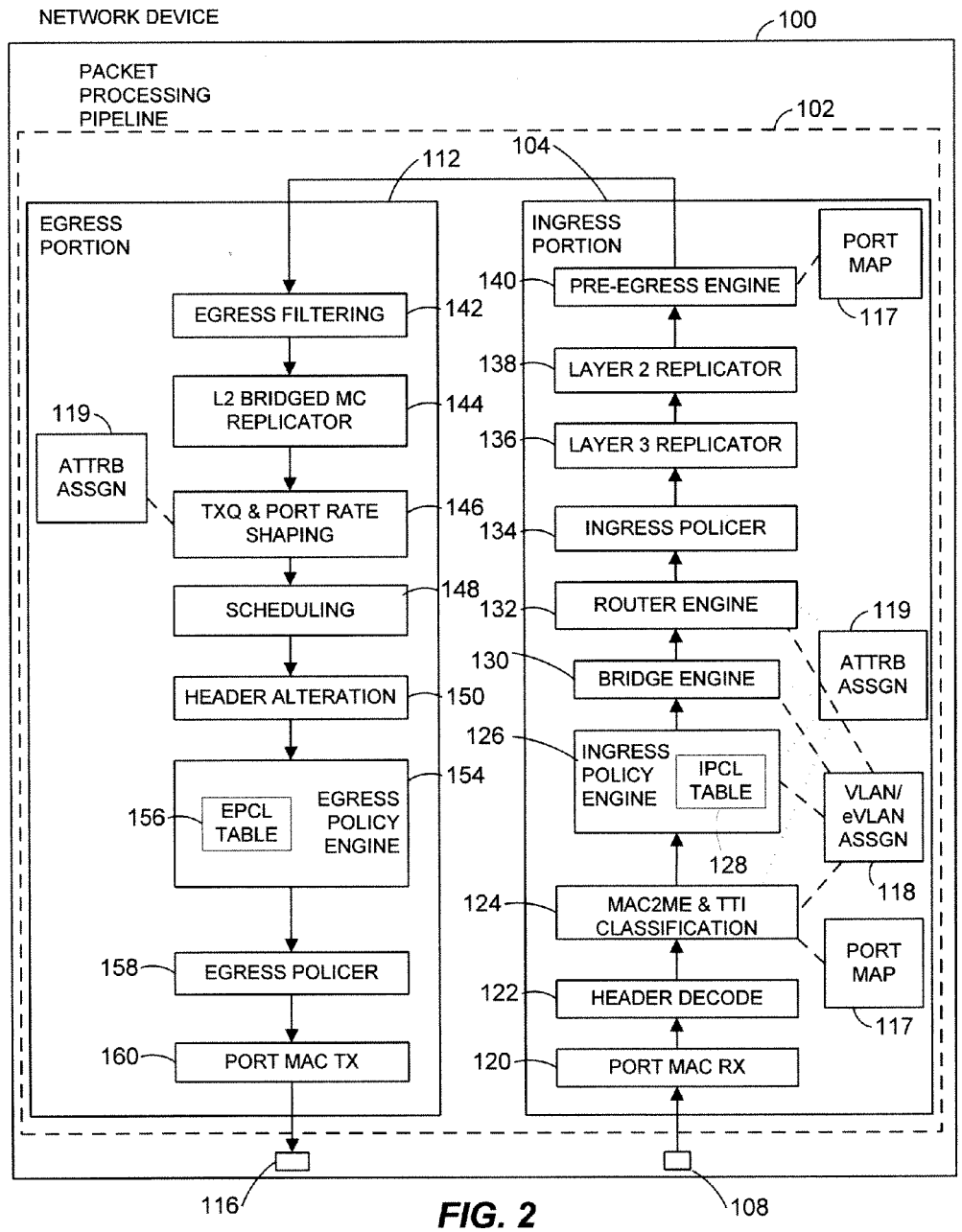
FIG. 2 is diagram of an example network device configured to support extended ports, in accordance with an embodiment of the disclosure.

FIG. 2 is a block diagram of an example network device 100 configured for processing and forwarding data units, i.e., packets, using standard and extended ports, according to an embodiment. The network device 100 provides multiple communication links to and between other devices, such as bridges, routers, other switches in a multi-switch switching system, endpoints, etc. In an embodiment, a first set of such other devices supports eVLANs and/or eports, and a second set such other devices does not support eVLANs or eports. As used herein, devices that do not support eVLANs or eports are referred to as "legacy devices" or "standard devices," and devices that do support eVLANs or eports are referred to as "non-legacy devices." Generally, a standard or legacy device utilizes physical ports and not eports, and a non-legacy device utilizes a many-to-one correspondence between logical ports (e.g., "eports" or "extended logical ports") and a single physical port.

The network device 100 is configured as both a legacy and as a non-legacy device, and thus supports legacy and non-legacy ports, legacy and non-legacy VLANs, and other legacy and non-legacy information. That is, using a single configuration, the network device 100 may be used in a first application to support legacy (e.g., standard) ports and the routing of packets between the standard ports, in one instance. As used here, in term "standard port" and "physical port" are used interchangeably. In another instance, the network device 100, using the same configuration, may be used in a different application to support non-legacy (e.g., extended) ports and the routing of packets between the extended ports. As such, the network device 100 is simultaneously configured to utilize standard port identifiers and standard VLAN identifiers when processing and forwarding packets as a legacy device, and the network device 100 is simultaneously configured to utilize eport identifiers and/or eVLAN identifiers when processing and forwarding packets as a non-legacy device. Thus, the network device 100 is backwards compatible as it does not require re-configuring of either hardware or software in order to support both legacy and non-legacy ports. For ease of explanation, but not as a limitation, the disclosure herein generally refers to extended ports ("eports") and extended VLANs ("eVLANs"), although it is understood that the techniques discussed herein may easily be applied to standard ports and standard VLAN identifiers.

In one embodiment, the network device 100 is utilized in a switch system (not shown) comprising a plurality of interconnected switches. In this embodiment, the network device 100 is coupled to other switches in the switch system via some of the physical ports 108, 116. The network device 100 includes a packet processing pipeline or forwarding engine 102 coupled to one or more ingress physical ports 108 and to one or more egress physical ports 116. The packet processing pipeline or forwarding engine 102 includes an ingress portion 104 coupled to an egress portion 112, in an embodiment.

In one embodiment, a plurality of switches, including the network device 100, are implemented on a plurality of respective integrated circuits (ICs). In some other embodiments, the network device 100 and one or more other switches in the plurality of switches are implemented on a single IC. In one such embodiment, the network device 100 is coupled to one or more other switches in the plurality of switches via one or more corresponding cascade ports.

The ingress physical ports 108 and the egress physical ports 116 are coupled to a plurality of different networks and to other legacy and/or non-legacy switches in the switching system, in some embodiments. For example, the ingress physical ports 108 and the egress physical ports 116 are coupled to a provider network, to one or more customer networks, and/or to one or more other switches in the switching system, in various embodiments. For purposes of clarity, only one ingress physical port and one egress physical port are seen. In an embodiment the packet processing pipeline is coupled to, and configured to forward packets among, a plurality of physical ports.

In one embodiment, the ingress physical ports 108 and the egress physical ports 116 of the network device 100 provide multiple 2-way, point-to-point communication links to other devices, such as bridges, other switches in the switching system, endpoints, etc.

The forwarding engine 102 generally transfers packets of data from the ingress physical ports 108 to appropriate egress physical ports 116, in an embodiment. In some embodiments, at least some physical ports are input/output ports, and at least some ingress physical ports 108 and egress physical ports 116 correspond to the same physical ports.

As seen in FIG. 2, the ingress portion 104 and the egress portion 112 each include a plurality of processing units coupled in series. Generally, each unit of a pipeline optionally processes a packet or a packet descriptor corresponding to the packet and then passes the packet or the packet descriptor to the next unit in the pipeline. A packet descriptor includes some information from the packet, such as some or all of the header information of the packet, in an embodiment. In some embodiments, the packet descriptor includes other information as well such as an indicator of where the packet is stored in a memory associated with the network device 100. For ease of explanation, the term "packet" hereinafter is used to refer to a packet itself or to a packet descriptor associated with the packet. Each unit in the pipeline 102 may or may not process a particular packet. For example, in some instances, a unit simply passes a packet onto the next unit in the pipeline 102. The last unit of the ingress portion 104 passes the packet to the first unit of the egress portion 212 via the fabric interface 218, in an embodiment.

Each or at least some of the units of the ingress portion 104 and the egress portion 112 includes, or otherwise is associated with, a corresponding memory, in an embodiment. A packet received by a unit is stored in the memory associated with the unit, in an embodiment.

According to an embodiment, the ingress portion 104 assigns an eport to an ingressing packet. At least in some scenarios, the ingress portion 104 also assigns an eVLAN to the ingressing packet. The ingress portion 104 also assigns attributes to the packet based on the assigned eport and/or the assigned eVLAN. In some embodiments and scenarios, the eport and/or the eVLAN are reassigned as the packet is processed by the ingress portion 104. In some embodiments and scenarios, the egress portion 112 also assigns attributes to the packet based on the eport and/or the eVLAN. The assigned attributes are utilized by units of the pipeline 102 to determine how the packet is to be processed, for example. For example, determining whether to forward, trap, or mirror a packet is based on an attribute assigned based on an eport and/or a eVLAN, in an embodiment. As another example, a source address of a packet is learned or learning of the source address is disabled based on an attribute assigned based on an eport and/or an eVLAN, in an embodiment.

The packet processing pipeline or forwarding engine 102 includes a mapping unit 117 at least partially distributed amongst a plurality of processing units, in an embodiment. The mapping unit 117 generally maps ingressing packets to eports (and vice versa) in a manner similar to the mapping unit 32 discussed with reference to FIG. 1.

The packet processing pipeline or forwarding engine 102 also includes an assignment unit 118 at least partially distributed amongst a plurality of processing units, in an embodiment. In other embodiments, the assignment unit 118 is not distributed amongst a plurality of processing units, but rather is implemented in a single processing unit. The assignment unit 118 generally assigns some packets to eVLANs in a manner similar to the VLAN assignment unit 60 discussed with reference to FIG. 1.

Additionally, the packet processing pipeline or forwarding engine 102 includes an attribute assignment unit 119 at least partially distributed amongst a plurality of processing units, in an embodiment. In other embodiments, the attribute assignment unit 119 is not distributed amongst a plurality of processing units, but rather is implemented in a single processing unit. The attribute assignment unit 119 generally assigns one or more attributes to packets based on an eport assigned to a packet, and/or based on an eVLAN assigned to the packet, where the attributes indicate how the packet should be processed by the packet processing pipeline 102, e.g., the one or more attributes indicate one or more respective processing actions. The attribute assignment unit 119 operates similarly to the attribute assignment 66 discussed with reference to FIG. 1 for non-legacy support, and operates similarly to attribute assignment entities in legacy devices for legacy support.

In the network device 100 as shown in FIG. 2, the mapping unit 117, the assignment unit 118, and the attribute assignment unit 119 are illustrated as single entities that support both legacy and non-legacy ports and VLANs. In some embodiments (not illustrated), the legacy support and the non-legacy support are separately provided by distinct entities in one or more of the mapping unit 117, the assignment unit 118, and/or the attribute assignment unit 119. For example, a legacy port mapping unit and a non-legacy eport mapping unit are included in the network device 100, in an embodiment. In another example, a legacy VLAN assignment unit, a non-legacy eVLAN assignment unit, a legacy port attribute assignment unit, and an eport attribute assignment unit are included in the network device 100.

In the example of FIG. 2, the ingress portion 104 includes a port media access control (MAC) receiver unit 120 coupled to the ingress physical ports 108. The port MAC receiver unit 120 generally implements media access control functions. The port MAC receiver unit 120 also generally interfaces the ingress portion 104 with a particular physical ingress port of the network device 100 (i.e., if the network device 100 includes a plurality of physical ingress ports, the network device 100 includes a plurality of respective port MAC receiver units 120). In another embodiment, one port MAC receiver unit 120 interfaces the ingress portion 104 with a plurality of physical ingress ports (not shown for purposes of clarity) of the network device 100.

A header decode unit 122 is coupled to the port MAC receiver unit 120 and generally decodes the header of each packet received via the ingress physical ports 108. This may include parsing or identifying different segments of the header for use by subsequent units in the ingress pipeline 104 and, optionally, units in the egress pipeline 112.

In one embodiment in which the network device 100 is one of a plurality of switches in a switching system, at least some packets corresponding to eports include a distributed switching architecture (DSA) tag in a header of the packet. The DSA tag includes information used by the switching system to forward the packet through the switching system. The DSA tag is included in a header of the packet by a source switch device in the switching system, and is removed from the packet by a target switch device in the switching system before or as the packet egresses the switching system. In one embodiment, the DSA tag includes indications of one or more of i) a source device (i.e., a source switch device in the switching system), ii) a target device (i.e., a target switch device in the switching system), tip a physical source port, iv) a physical target port, etc. In one embodiment, the DSA tag additionally or alternatively includes indications of one or more of i) a source eport, ii) a target eport, iii) an eVLAN, iv) an index indicating a list of eports (e.g., Extended Virtual LAN Identifier Index or "eVIDX") and/or v) an index indicating a list of physical ports to which the packet should be replicated (e.g., Virtual LAN Identifier Index or "VIDX"), etc. As will be described in more detail below, when a packet is to be broadcast, multicast, flooded, etc., for example, a replication unit of the network device 100 utilizes the VIDX to determine how many copies of a packet to create, and to determine the physical ports to which the copies should be passed. Similarly, when a packet is to be broadcast, multicast, flooded, etc., for example, a replication unit of the network device 100 utilizes the eVIDX to determine how many copies of a packet to create, and to determine the eports to which the copies should be passed.

In an embodiment, VIDX is an index to a VIDX table that indicates physical ports to which the packet is to be duplicated. In one embodiment, each entry in the VIDX table includes a pointer to a list of physical ports to which the packet is to be duplicated. Similarly, in an embodiment, eVIDX is an index to a duplication table that indicates eports to which the packet is to be duplicated. In one embodiment, each entry in the duplication table includes a pointer to a list of eports to which the packet is to be duplicated. In another embodiment, eVIDX is either an index to the VIDX table or an index to the duplication table depending on the value of eVIDX.

In some embodiments, the use of eVIDX and VIDX is combined. For example, in one embodiment, an eport entry in the eVIDX duplication table indicates a VIDX. In another embodiment, an eport corresponding to an entry in the eVIDX duplication table is mapped to a VIDX. In both of these embodiments, the packet is duplicated both to eports indicated by the eVIDX and physical ports indicated by the VIDX.

A MAC2ME & TTI classification unit 124 is coupled to the header decode unit 122. The MAC2ME & TTI classification unit 124 generally performs several functions. First, the MAC2ME & TTI classification unit 124 assigns a source eport to each packet. In one embodiment, an eport identifier is a 20-bit value that indicates a physical port or a virtual port. In other embodiments, the eport identifier is represented by a different suitable number of bits. As used herein, the term "eport" is used interchangeably with "eport identifier."

Second, the MAC2ME & TTI classification unit 124 assigns an eVLAN to at least some packets. In one embodiment, the eVLAN identifier is a 16-bit value. In other embodiments, the eVLAN is represented by a different suitable number of bits. As used herein, the term "eVLAN" is used interchangeably with "eVLAN identifier."

Third, the MAC2ME & TTI classification unit 124 generally performs two lookup functions. In a first lookup function (a MAC2ME lookup), packets that are destined to a MAC address, eVLAN pair recognized by the network device 100 are identified. This identification may be used in one or more subsequent functions or pipeline units. A second lookup function (a tunnel termination and interface assignment (TTI) lookup) is used for tunnel termination identification and interface assignment, reassigning the eport, and/or assigning the eVLAN according to L2 or L3 header fields.

The MAC2ME & TTI classification unit 124 utilizes one or more tables, databases, and/or other data library maintained in one or more memory components (such as a ternary content-addressable memory (TCAM)). The one or more tables, databases, etc., are consulted to identify a table entry or database record that matches, or closely approximates, the format and structure of the ingressed packet, in an embodiment.

In some embodiments, the MAC2ME & TTI classification unit 124 assigns an egress eport to at least some packets in response to a TTI lookup in an embodiment. On the other hand, in some embodiments, the MAC2ME & TTI classification unit 124 does not assign an egress eport to at least some packets in response to the TTI lookup. In an embodiment, assigning an egress eport comprises including an egress eport identifier in the packet descriptor for the packet. In one embodiment, the MAC2ME & TTI classification unit 124 assigns an eVIDX to at least some packets in response to a TTI lookup in an embodiment. On the other hand, in some embodiments, the MAC2ME & TTI classification unit 124 does not assign an eVIDX to at least some packets. In an embodiment, assigning an eVIDX comprises including an eVIDX identifier in the packet descriptor for the packet. The terms "eVIDX" and "eVIDX identifier" are used interchangeably herein.

The MAC2ME & TTI classification unit 124 includes a portion of the mapping unit 117, and the mapping unit 117 implements assignment of the source eport, in an embodiment. Also, the MAC2ME & TTI classification unit 124 includes a portion of the VLAN assignment unit 118, and the VLAN assignment unit 118 implements assignment and reassignment of the eVLAN, in an embodiment. Additionally, the MAC2ME & TTI classification unit 124 includes a portion of the attribute assignment unit 119, and the attribute assignment unit 119 implements assignment of attributes based on the eport and/or the eVLAN, in an embodiment.

An ingress policy engine 126 is coupled to the MAC2ME & TTI classification unit 124. The ingress policy engine 126 generally performs flow classification. A flow corresponds to related series of packets, and may be defined in a variety of different ways. One example of a flow is defined by a MAC source address or a particular MAC destination address in a medium access control (MAC) header. In other words, in one example, all packets having a particular MAC source address correspond to a particular flow. Another example of a flow is defined by a MAC source address/destination address pair. In other words, in one example, all packets having both a particular MAC source address and a MAC destination address correspond to a particular flow. Additionally, fields from different protocol layers may be combined to define a flow, in some embodiments. For example, the ingress policy engine 126 attaches or otherwise associates a flow identifier (ID) to/with a packet to indicate a flow to which the packet belongs, in an embodiment. In at least some scenarios and implementations, the flow ID is removed from the packet before or upon egress from the network device 100. For example, if the network device 100 is a component of a switching system including other similar network devices (not shown), and if the packet is exiting the switching system, the flow ID is removed from the packet before or upon egress from the network device 100, in an embodiment. On the other hand, if the network device 100 is a component of a switching system including other similar network devices (not shown), and if the packet is being forwarded to another network device in the switching system, the flow ID is included in a DSA tag of the packet (if a DSA tag is included) before or upon egress from the network device 100, in an embodiment. In some instances, the ingress policy engine 126 assigns an eVLAN to a packet, according to an embodiment.

In an embodiment, the ingress policy engine 126 includes, or is coupled to, a TCAM or other suitable memory. An entry in the TCAM or other suitable memory indicates a particular rule or set of one or more actions to be performed (with regard to flow measurement, eVLAN assignment, egress eport assignment, etc., for example). In some scenarios, at least some of the actions to be performed are to be performed by processing units downstream from the ingress policy engine 126. Thus, in some scenarios, the ingress policy engine 126 assigns attributes to the packet to indicate to downstream processing units how the packet is to be processed, or what processing action or actions are to be performed. In an embodiment, assigning an attribute comprises including an attribute indicator in the packet descriptor for the packet. The ingress policy engine 126 also includes, or is coupled to, one or more other memories, such as an SRAM or other suitable memory, in an embodiment. In this embodiment, an entry in the TCAM or other suitable memory indirectly indicates a rule or set of one or more actions to be performed, and determining a rule or action to be performed utilizes the one or more additional memory components such as the SRAM.

To gain access to the TCAM for determining actions to be performed on the packet being processed and/or attributes corresponding thereto, the ingress policy engine 126 uses the contents of one or more fields of the header of the packet (and, in some cases, other information) to determine a key to access the TCAM. In an embodiment, the ingress policy engine 126 uses the source eport and/or the eVLAN as an index to look up a key format for the key. In an embodiment, an index to an IPCL 128 (Ingress Policy Control List) is based on the source eport and/or the eVLAN to determine the key format.

The IPCL 128 is a table or other suitable memory format that indicates a correspondence between ports/eports and key formats, and/or between VLANs/eVLANs and key formats. Accordingly, for a given port, a given eport, a given VLAN, and/or a given eVLAN, a suitable key format is indicated by the IPCL 128. In an embodiment of the IPCL 128, each entry of the IPCL 128 includes an index and various fields of a corresponding key format. In an embodiment, each entry of the IPCL 128 is indexed based on standard port, eport, standard VLAN, or eVLAN. In one example, an IPCL 128 or portion thereof includes 4K entries or another suitable number of entries indexed by port or eport, and/or the IPCL 128 or portion thereof includes 64K entries or some other suitable number of entries indexed by VLAN or eVLAN, in an embodiment. The IPCL 128 is typically included in the ingress policy engine 126, although in some embodiments, the IPCL 128 is separate from but coupled to and accessible by the ingress policy engine 126.

In an embodiment, the ingress policy engine 126 generates an index to a particular entry of the IPCL 128 based on the contents of one or more fields of the header of the packet and other information. In an embodiment, the index may be generated based on a standard port identifier, an eport identifier, a standard VLAN identifier, or an eVLAN identifier. Using the index, the ingress policy engine 126 obtains a corresponding key format from the particular entry, and formats and populates a key according to the key format, in an embodiment. The ingress policy engine 126 then uses the key to access the TCAM or other suitable memory, in an embodiment. As such, a size of a key is necessarily limited by a length of a line in the TCAM or other suitable memory, as the memory format is typically unchangeable due to prohibitive costs. However, as previously discussed, the length of an eport identifier is typically greater than the length of a standard port identifier, and the length of an eVLAN identifier is typically greater than the length of a standard VLAN identifier.

Figure 3:
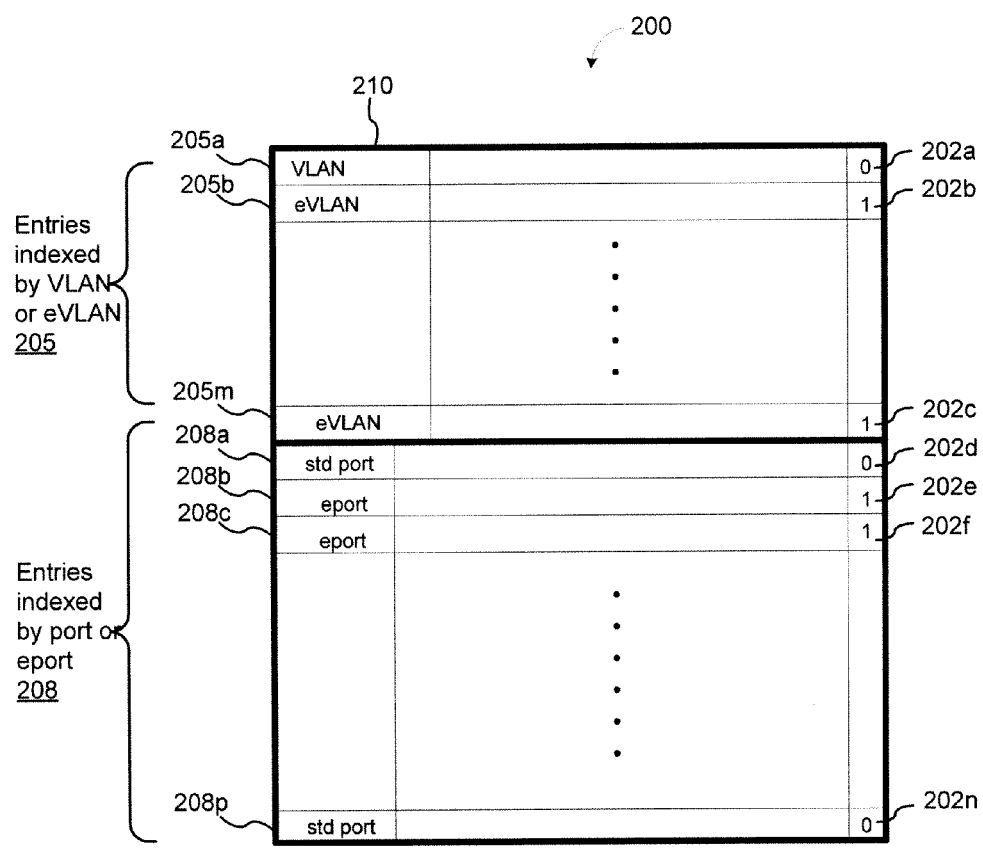
FIG. 3 illustrates an exemplary embodiment of key extension indicators, in accordance with an embodiment of the disclosure.

Accordingly, to support both legacy and non-legacy ports (e.g., to support full backwards compatibility) without requiring a re-configuration and while minimizing costs, the IPCL 128 includes a key extension indicator. The key extension indicator provides an indication of whether a key format corresponds to standard ports and VLANs, or corresponds to extended ports and eVLANs. FIG. 3 illustrates an exemplary embodiment of an IPCL table 200 including a key extension indicator 202a-202n for each entry in the table 200. The IPCL table 200 may be, for example, an embodiment of the IPCL 128 of FIG. 2. The IPCL 200 includes a first set of entries 205a-205m indexed based on VLAN or eVLAN (e.g., 4K entries or other suitable number of entries), and a second set of entries 208a-208p indexed based on standard port or eport (e.g., 64K entries or other suitable number of entries). Each entry includes a single bit appended to the end of the respective entry (e.g., bits 202a-202n), where the single bit is a respective key extension indicator corresponding to the respective entry (205a-205m, 208a-208p).

In this embodiment, each key extension key extension indicator 202a-202n is set to a value indicating whether or not a respective entry corresponds to a standard port or VLAN. In an embodiment, if a key extension indicator 202a-202n is set to bit value "0," the entry corresponds to a standard physical port or VLAN, and if the key extension indicator 202a-202n is set to the bit value "1," the entry corresponds to an extended logical port or extended VLAN.

For example, each entry 205a-205m and 208a-208p is indexed (reference 210) based on either a port/eport identifier or a VLAN/eVLAN identifier. As the index to entry 205a corresponds to a standard VLAN (and, consequently, does not correspond to an extended VLAN), the corresponding key extension indicator 202a is set to a bit value of "0." As the entries 205b and 205m each correspond to an eVLAN identifier, corresponding key extension indicators 202b and 202c are each set to a bit value of "1." In an embodiment, 16 bits of the VLAN or the eVLAN are used to index into the IPCL 128, and in some embodiments, a mask is used to determine the 16 bit index. Similarly, for entries indexed based on port or eport, indexes for entries 208a and 208p correspond to standard ports (and, consequently, do not correspond to any extended port), and thus corresponding key extension indicators 202d and 202n are each set to bit value "0." Indexes for entries 208b and 208c correspond to eports, and thus corresponding key extension indicators 202e and 202f are each set to bit value "1." In an embodiment, 8 bits of the standard port or the eport are used to index into the IPCL 128, and in some embodiments, a mask is used to determine the 8 bit index.

In other embodiments, bit values of the key extension indicators indicate the converse, i.e., bit value "1" corresponds to an index based on standard port or VLAN, and bit value "0" corresponds to an index based on an eport identifier or an eVLAN identifier. In other embodiments, the value of the key extension indicator may be one of more than two values, such as in embodiments where the key extension indicator is greater than a single bit.

Irrespective of the value convention used for the key extension indicators 202a-202n, though, if the value of a key extension indicator indicates a standard port or VLAN, the ingress policy engine 126 retrieves the corresponding standard key format from the IPCL entry 205, 208 and populates the standard key format using information included in the packet, in an embodiment. Retrieval and population of standard key formats are done in a manner similar to currently performed by legacy devices, in an embodiment. An example of a standard key format is further described in a subsequent section.

If the value of the key extension indicator indicates an extended port or extended VLAN, the ingress policy engine 126 retrieves a corresponding key format from the IPCL entry 205, 208, in an embodiment. Based on the value of the corresponding key extension indicator 202a-202n, though, the ingress policy engine 126 appends an extension field or an extension block to the key format to generate an extended key format. In an embodiment, the ingress policy engine 126 adds a fixed-length extension block (e.g., a field of 26 bytes) to generate the extended key format. In other embodiments, the ingress policy engine 126 adds a variable length extension block. For example, a first byte or first portion of the extension block indicates a size of one or more subsequent fields included in the variable-length extension block, in an embodiment. The ingress policy engine 126 populates the extension block with suitable information from the packet, such as described below with respect to FIG. 4.

Figure 4:
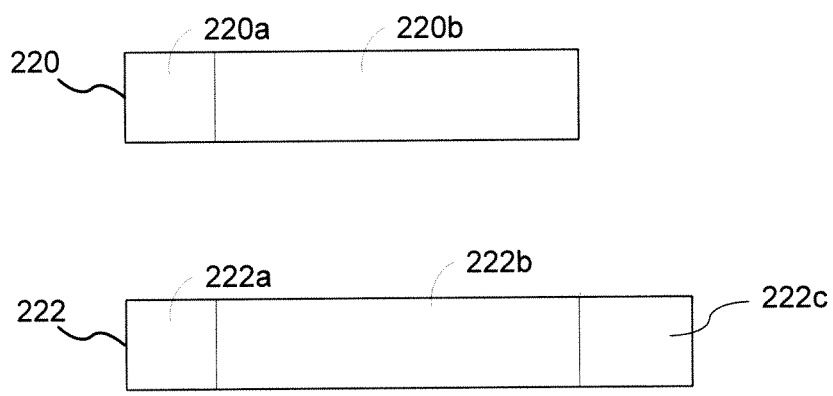
FIG. 4 illustrates block diagrams of example key formats, in accordance with an embodiment of the disclosure.

FIG. 4 illustrates block diagrams of example key formats 220-222 that are able to be generated and populated by the ingress policy engine 126, in an embodiment. The ingress policy engine 126 generates the key formats 220-222 based on the IPCL 200 of FIG. 3, and populates the key formats 220-222 based on corresponding information included in the packet header to generate the key to the TCAM, in an embodiment.

The example key format 220 corresponds to entry 205a of FIG. 3, which is indexed based on a standard VLAN. For instance, the index is based on a selected number bits of the standard VLAN, in an embodiment. The key format 220 includes a first field 220a having a suitable number of bits corresponding to a standard VLAN identifier, and the key format 220 further includes one or more second fields 220b corresponding to other information related to the packet (e.g., MAC destination address, MAC source address, Ethernet type, etc.). The ingress policy engine 126 populates the fields 220a and 220b based on information included in the packet, such as information included in the packet header or information generated based on the information included in the packet header. For example, the ingress policy engine 126 populates the field 220a with a VLAN identifier corresponding to the packet.

The example key format 222 corresponds to entry 205b of FIG. 3, which is indexed based on an eVLAN. For instance, the index is based on the same selected number of bits of the eVLAN as were used for the standard VLAN in the example key format 220, in an embodiment. Accordingly, the key format includes a suitable number of standard key format fields 222a-222b and additionally includes an extension field 222c. In the key format 222, a first field 222a includes a suitable number of bits corresponding to a standard sized VLAN identifier. However, as indicated by the corresponding key extension indicator 202b, entry 205b of FIG. 2 corresponds to an eVLAN, which is typically longer than a standard VLAN. Accordingly, the ingress policy engine 126 populates the field 222a with a first number of bits of the eVLAN corresponding to the packet, and populates an extension block 222c appended to the key format 222 with a second number of bits of the eVLAN corresponding to the packet. For instance, bits 0 through 11 of the eVLAN are populated into the field 222a, and bits 12 to 15 of the eVLAN are populated into the extension block 222c. Similarly, for one or more other fields 222b of the key format 222, a first number of bits corresponding to a respective standard equivalent (if any) is included in a corresponding field 222b, and a second number of the bits corresponding to an extended equivalent is allocated to the extension block 222c. In some embodiments, the second number of bits is equivalent to the remainder of bits excluded from the first field 222a. If some desired field of the extended key format does not have an equivalent in the standard key format, the entirety of the extended field is populated into the extension block 222c, in an embodiment. For instance, a DSA tag corresponding to the eVLAN is populated into the extension block 222c, in an embodiment.

Similarly, although not illustrated, key formats corresponding to entries indexed based on eport (e.g., entries 208b and 208c of FIG. 3) are allocated and populated in a manner similar to the key format 222 that is indexed based on eVLAN, in an embodiment. In particular, a first number of bits of an eport is populated into a first standard sized field, where the first number of bits is equivalent to a length of a corresponding standard port, in an embodiment. A second number of bits (e.g., the remainder of bits or some other number of bits) of the eport identifier is populated into a respective extension field or block, in an embodiment. In some embodiments, other information included in extended key formats is distributed across corresponding standard sized fields and extension blocks in a similar manner.

In an embodiment, an extension block such as block 222c is allocated and/or populated with at least one of a tag field, a subset of a total number of bits included in an eVLAN, or a subset of a total number of bits included in a non-standard port identifier. In some embodiments, the extension block includes information that exclusively corresponds to one or more other fields or subfields related to eVLANs and/or eports. In an embodiment, the extension block includes one or more user defined bytes or subfields. For instance, twenty user defined bytes are included in the extension block, in an embodiment.

Turning back to FIG. 3, although FIG. 3 illustrates a key extension indicator as being a single bit appended to the end of each entry in the IPCL 200, other embodiments of key extension indicators each have more than one bit and/or the key extension indicator is located differently in the entry. For example, a key extension indicator of a single bit is prepended or inserted into each entry of the IPCL 200, in an embodiment. In some embodiments, each key extension indicator includes more than a single bit. For example, each key extension indicator is two bits or some other suitable number of bits to support providing additional desired information, in some embodiments.

In some embodiments, key extension indicators are not associated with a particular eport or eVLAN (such as in the IPCL 200), but instead are associated with more than one eport or eVLAN. In these embodiments, the key extension indicators are not stored in the IPCL 200, but instead are stored in a memory location accessible by the ingress policy engine 126. In an example, a first global key extension indicator corresponds to two or more MAC source addresses, where the two or more MAC source addresses correspond to respective source devices that support extended ports and/or extended VLANs. Thus, with the first global key extension indicator, the ingress policy engine 126 appends an extension block to key formats of all entries in the IPCL 128 or 200 that correspond to the two or more MAC source addresses, in an embodiment. In another example, a second global key extension indicator corresponds to two or more MAC destination addresses, where the two or more MAC destination addresses correspond to respective destination devices that support extended ports and/or extended VLANs. Thus, with the second global key extension indicator, the ingress policy engine 126 appends an extension block to key formats of all entries in the IPCL 128 or 200 that correspond to the two or more MAC destination addresses, in an embodiment. Other examples of non-entry specific key extension indicators corresponding to different groups of eports or eVLANs are possible.

Turning back to the ingress policy engine 126 of FIG. 2, the ingress policy engine 126 includes a portion of the assignment unit 118, and the assignment unit 118 implements assignment and reassignment of the eVLAN, in an embodiment. Additionally, the ingress policy engine 126 includes a portion of the attribute assignment unit 119, and the attribute assignment unit 119 implements assignment of attributes based on one or more of i) the source eport, ii) the eVLAN, iii) the lookup performed by the ingress policy engine 126, etc., in an embodiment.

A bridge engine 130 is coupled to the ingress policy engine 126. The bridge engine 130 includes, or is coupled to, a forwarding database (not shown) that includes MAC destination addresses and indications of the corresponding egress eports to which packets having the MAC destination addresses should be forwarded. In one embodiment, the forwarding database includes a table of MAC destination addresses and indications of the corresponding egress eports. In an embodiment, the forwarding database more generally includes both MAC source addresses and MAC destination addresses, and provides a binding of a MAC address to an eport and other parameters. These bindings are used mainly for forwarding decisions, but are for other purposes as well, such as for mirroring packets to an analyzer for further analysis, user defined functions or applications, etc. The bridge engine 130 performs MAC source address lookups and MAC destination address lookups, in some embodiments and in at least some scenarios.

In an embodiment, the bridge engine 130 generally uses Layer-2 information to determine on which eport or eports a packet should be forwarded. Determination of whether, and to where a packet should be forwarded, is done by examining the MAC destination address of the packet and determining to which network segment the destination address corresponds using the forwarding database, for instance. Also, other information is utilized as well in other embodiments and/or instances. The bridge engine 130 also maintains the forwarding database, in some embodiments.

In general, the forwarding database correlates several variables useful for making forwarding decisions. The forwarding database comprises entries based upon eVLAN, eport, and MAC address, for instance; lookup operations based upon MAC address and eVLAN are useful in bridging operations, for example. The bridge engine 130 makes forwarding decisions also using information provided by the MAC2ME & TTI classification unit 124, in an embodiment. Thus, the forwarding database records or table entries include fields associated with one or more of a destination MAC address, an eport, an eVLAN, etc. In an embodiment, when a packet is to be flooded (e.g., when there is not a match in the forwarding database with the destination MAC address), or when the packet is a multicast or broadcast packet, the bridge engine 130 determines a set of one or more eports to which the packet is to be forwarded based on a corresponding eVIDX.

The bridge engine 130 includes a portion of the VLAN assignment unit 118, and the VLAN assignment unit 118 implements assignment of an egress eVLAN and/or eVIDX, in an embodiment. Additionally, the bridge engine 130 includes a portion of the attribute assignment unit 119, and the attribute assignment unit 119 implements assignment of attributes based on one or more of i) the source eport, ii) the eVLAN, the forwarding database lookup performed by the bridge engine 130, etc. in an embodiment. Examples of attributes assigned by the bridge engine 130, in various embodiments, include enabling trapping to a processor/central processing unit (CPU)/analyzer (not shown) predefined control protocol packets, enabling learning of new addresses, triggering processor/CPU/analyzer (not shown) notification when a new address is learned, indicating an action to be taken when a packet has an unknown or unregistered address, etc.

A router engine 132 is coupled to the bridge engine 130. If a received packet is not destined for a network to which the network device 100 is connected, then routing based on an Internet Protocol (IP) address is performed, in some embodiments and/or scenarios. The router engine 132 includes, or is coupled to, a routing information database (not shown) that includes information corresponding to where IP packets should be forwarded. The router engine 132 generally determines to where a received unicast IP packet or a received multicast IP packet should be routed, which includes determining the egress eports to which the packet should be forwarded. The router engine 132 also maintains the routing information database. In one embodiment, the router engine 132 utilizes a Layer-3 duplication table, wherein each entry in the Layer-3 duplication table is a linked list of eports. In one embodiment, the router engine 132 assigns an eVLAN and/or an eVIDX to a multicast packet to indicate the eports to which the packet is to be duplicated.

The router engine 132 includes a portion of the VLAN assignment unit 118, and the VLAN assignment unit 118 implements assignment of an eVLAN and/or eVIDX, in an embodiment. Additionally, the outer engine 132 includes a portion of the attribute assignment unit 119, and the attribute assignment unit 119 implements assignment of attributes based on one or more of i) the source eport, ii) the eVLAN, the routing information database lookup performed by the router engine 132, etc. in an embodiment. Examples of attributes assigned by the router engine 132, in various embodiments, include enabling/disabling of routing of Internet Protocol version 4 (IPv4) unicast packets, enabling/disabling of routing of IPv4 multicast packets, enabling/disabling of routing of Internet Protocol version 6 (IPv6) unicast packets, enabling/disabling of routing of IPv6 multicast packets, whether to perform source IP address-source MAC address checking (SIP-SA check) (a security check that checks whether the source IP address and the source MAC address of a packet are coupled in the routing information database), etc.

An ingress policer engine 134 is coupled to the router engine 132. The ingress policer engine 134 generally performs rate limiting and makes flow traffic measurements and stores flow measurement information for different flows, according to an embodiment. In some embodiments, the ingress policer engine 134 takes different actions for different flows. In an embodiment, the ingress policer engine 134 utilizes flow classification information from the ingress policy engine 126 in determining what actions should be taken. The ingress policer engine 134 includes a plurality of counters for making flow traffic measurements, according to an embodiment. The ingress policer engine 134 samples packets, according to an embodiment. Additionally, the ingress policer engine 134 applies time stamps to packets or to descriptors associated with the packets, according to an embodiment.

A Layer-3 replicator unit 136 is coupled to ingress policer engine 134. When a Layer-3 routed packet that is to be transmitted to multiple destinations is received by the Layer-3 replicator unit 136, the Layer-3 replicator unit 136 creates one or more duplicates of the packet for forwarding to the set of one or more eports determined by the router engine 132. In an embodiment, the Layer-3 replicator unit 136 utilizes the Layer-3 duplication table.

A Layer-2 replicator unit 138 is coupled to the Layer-3 replicator unit 136. When a Layer-2 bridged packet that is to be transmitted to multiple destinations is received by the Layer-2 replicator unit 138, the Layer-2 replicator unit 138 creates one or more duplicates of the packet for forwarding to the set of one or more eports determined by the bridge engine 130. In an embodiment, the Layer-2 replicator unit 138 utilizes the Layer-2 duplication table to determine the eports to which the packet is to be directed.

A pre-egress engine 140 is coupled to the Layer-2 replicator unit 138. The pre-egress engine 140 consolidates decisions of previous units in the ingress portion 104 into a single decision, and updates the descriptor of the packet accordingly.

The egress portion 112 is coupled to the pre-egress engine 140, in an embodiment. In one embodiment and in some scenarios, the pre-egress engine 140 determines one or more physical targets corresponding to the one or more target eports to which a packet is to be forwarded when the target device for the packet is the network device 100. A physical target could be a physical port/device pair, a trunk, a tunnel start, a list of physical ports, etc. The pre-egress engine 140 includes a portion of the mapping unit 117, and the mapping unit 117 implements a determination of the one or more physical targets corresponding to each target eport to which a packet is to be forwarded, in an embodiment.

In an embodiment, an egress filtering unit 142 is coupled to the pre-egress engine 140. The egress filtering unit 142 utilizes eports and/or eVLANs to perform egress filtering. In some scenarios, a packet that is to be flooded, or a multicast or broadcast packet is not to be egressed via the same eport on which it ingressed. Thus, the egress filtering unit 142 filters the ingress eport from the plurality of egress eports via which the packet is to be transmitted, for example.

An egress Layer-2 multicast replicator unit (L2 Bridged MC Replicator) 144 is coupled to the egress filtering unit 142. The Layer-2 multicast replicator unit 144 replicates packets, in some scenarios, such as packets received from another switch device and that are to be flooded, or are multicast or broadcast packets. A multi-target destination is indicated via eVIDX, in an embodiment. If a packet is multi-target (i.e. broadcast, multicast, or unknown unicast), the packet is replicated for each egress eport member of the eVIDX group.

The Layer-2 multicast replicator unit 144 provides unicast traffic to at least one of a plurality of transmit queues. For Layer-2 duplicated packets, the Layer-2 multicast replicator unit 144 replicates the packet to physical ports according to the eVIDX, which indicates the physical ports (as will be described subsequently).

In an embodiment, the Layer-2 multicast replicator unit 144 includes a portion of the attribute assignment unit 119, and the attribute assignment unit 119 implements assignment of attributes based on one or more of i) the target eport, ii) the eVLAN, etc. in an embodiment. In another embodiment, the Layer-2 multicast replicator unit 144 does not include a portion of the attribute assignment unit 119 and is not involved in assigning attributes.

The Layer-2 multicast replicator unit 144 provides the packet to a transmit queuing and port rate shaping unit (transmit queuing unit) 146. The transmit queuing unit 146 generally queues packets in a plurality of queues corresponding to different classes of flows and/or different physical ports, for example. The transmit queuing unit 146 also generally performs rate shaping.

The transmit queuing unit 146 includes a portion of the attribute assignment unit 119, and the attribute assignment unit 119 implements assignment of attributes based on one or more of i) the target physical port, ii) the target eport, iii) the eVLAN, etc. in an embodiment. Examples of attributes that are assigned based on the target eport include whether to enable egress filtering, whether to enable spanning tree protocol filtering, whether to enable unicast local switching filtering, whether to enable multicast local switching filtering, a VLAN tag state (i.e., an indication of which VLAN tag(s) to include in the egressing packet, and, if multiple VLAN tags, the order of the tags), etc.

A scheduling unit 148 is coupled to the transmit queuing unit 146. A header alteration unit 150 is coupled to the scheduling unit 148. In some scenarios, an ingressing packet has a VLAN field and MAC field in the packet header, and in some scenarios, it is necessary to modify the VLAN field (e.g., depending upon the VLAN associated with the MAC DA) or to multicast the packet to destination devices in different VLANs. It is noted that, in some embodiments, modification of a packet header occurs upon ingress to the provider network or upon egress from the provider network. The header alteration unit 150 maintains information allowing a packet header to be appropriately manipulated to facilitate such multicast operations, in some embodiments. In some implementations, the header alteration unit 150 manipulates the packet header independently or in cooperation with other units of the egress portion 112. The header alteration unit 150 enables control of tagging for customer networks or other subnetwork implementations, in some embodiments. To support this functionality, the header alteration unit 150 is embodied in or comprises a lookup table, database, or other suitable data structure correlating packet attribute information, eVLANs, VIDXs, MAC addresses, and customer VLAN tagging preferences. Additionally, the header alteration unit 150 points to a tunnel start entry that provides information regarding the required external header for a packet, in some scenarios; in that regard, a tunnel start entry defines a tunnel to be used to transmit the packet across a provider network.

An egress policy engine 154 is coupled to the header alteration unit 150. The egress policy engine 154 generally performs flow classification. When the packet belongs to a recognized flow, the egress policy engine 154 associates the packet with the flow. For example, the egress policy engine 154 attaches a flow identifier (ID) to a packet to indicate a flow to which the packet belongs, in an embodiment. In at least some scenarios and implementations, the flow ID is removed from the packet before or upon egress from the network device 100. For example, if the network device 100 is a component of a switching system including other similar network devices (not shown), and if the packet is exiting the switching system, the flow ID is removed from the packet before or upon egress from the network device 100, in an embodiment. On the other hand, if the network device 100 is a component of a switching system including other similar network devices (not shown), and if the packet is being forwarded to another network device in the switching system, the flow ID is included in a DSA tag of the packet before or upon egress from the network device 100, in an embodiment.

The egress policy engine 154 includes an EPCL table 156, in an embodiment. In a manner similar to that previously described for the ingress policy engine 126, the egress policy engine 154 accesses the EPCL table 156 or other suitable memory to determine a key format corresponding to the packet, in an embodiment. For example, the egress policy engine 154 indexes the EPCL table 156 or other suitable memory location based on information included in the packet to determine a value of a respective key extension indicator and to determine a key format (either standard or extended). Based on the respective key extension indicator, the egress policy engine 154 populates the key format to generate a key, in an embodiment. The key is used by the egress policy engine 154 to access the TCAM or other suitable memory to determine one or more egress processing actions that are to be performed on the packet. In an embodiment, the EPCL table 156 includes key extension indicators similar to the IPCL table 200 of FIG. 3. In other embodiments, the key extension indicators evaluated by the egress policy engine 154 are of a different format than the key extension indicators included in the IPCL 200. In some embodiments, the key extension indicators are stored in a memory location different than the EPCL table 156.

An egress policer engine 158 is coupled to the egress policy engine 154. The egress policer engine 158 generally performs rate limiting and makes flow traffic measurements, in an embodiment. A port MAC transmit unit 160 is coupled to the egress policer engine 158. The port MAC transmit unit 160 generally implements media access control functions and forwards packets to appropriate egress physical ports 116.

As previously discussed, attributes corresponding to processing actions to be performed on the packet by the ingress portion 104 (i.e., ingress attributes) are assigned based on the source port/eport and the VLAN/eVLAN. In one embodiment, as previously discussed, the ingress policy engine 126 determines a key based on source port/eport or VLAN/eVLAN to access a TCAM or suitable memory to determine the attributes corresponding to processing actions to be performed on the packet. In one embodiment in which the network device 100 is one of a plurality of switches in a switching system, ingress attributes are only utilized by the pipeline 102 and are not utilized by other switches. In another embodiment, one or more ingress attributes are also utilized by other switches. For example, if the source eport is a global eport (i.e., the eport is unique with respect to the plurality of switches), one or more ingress attributes are utilized by one or more other switches in the switching system.

Ingress attributes assigned based on the source port/eport are referred to as ingress port/eport attributes. In one embodiment, ingress port/eport attributes are assigned based on an ingress port/eport attribute table. For example, the ingress port/eport attribute table provides attributes corresponding to different source ports/eports, and a particular source port/eport provides an index to a particular entry of the ingress port/eport attribute table. In one embodiment, the ingress port/eport attribute table is distributed among different units of the ingress portion 104. In one embodiment, the ingress port/eport attribute table is included in the attribute assignment unit 119, which is itself at least partially distributed among different units of the ingress portion 104.

Ingress attributes assigned based on the VLAN/eVLAN are referred to as ingress VLAN/eVLAN attributes. In one embodiment, ingress VLAN/eVLAN attributes are assigned based on an ingress VLAN/eVLAN attribute table. For example, the ingress VLAN/eVLAN attribute table provides attributes corresponding to different VLANs/eVLANs, and a particular VLAN/eVLAN provides an index to a particular entry of the ingress VLAN/eVLAN attribute table. In one embodiment, the ingress VLAN/eVLAN attribute table is included in the attribute assignment unit 119.

Attributes corresponding to processing actions to be performed by the egress portion 112 (i.e., egress attributes) are assigned based on the target port/eport and the VLAN/eVLAN. In one embodiment, as previously discussed, the egress policy engine 154 determines a key based on target port/eport or VLAN/eVLAN to access a TCAM or suitable memory to determine the attributes corresponding to processing actions to be performed on the packet. In one embodiment in which the network device 100 is one of a plurality of switches in a switching system, egress attributes are only utilized by the pipeline 102 and/or by other switches in the switching system.

Egress attributes assigned based on the target port/eport are referred to as egress port/eport attributes. In one embodiment, egress port/eport attributes are assigned based on an egress port/eport attribute table. For example, the egress port/eport attribute table provides attributes corresponding to different target ports/eports, and a particular target port/eport provides an index to a particular entry of the egress port/eport attribute table. In one embodiment, the egress port/eport attribute table is included in the attribute assignment unit 119.

In one embodiment, egress attributes relevant only for egress physical ports are stored in a separate egress physical port attribute table. For example, the egress physical port attribute table provides attributes corresponding to different target physical ports, and a particular target physical port provides an index to a particular entry of the egress physical port attribute table.

In another embodiment, egress attributes relevant only for egress physical ports are stored in the egress port/eport attribute table.

Egress attributes assigned based on the VLAN/eVLAN are referred to as egress VLAN/eVLAN attributes. In one embodiment, egress VLAN/eVLAN attributes are assigned based on an egress VLAN/eVLAN attribute table. For example, the egress VLAN/eVLAN attribute table provides attributes corresponding to different VLANs/eVLANs, and a particular VLAN/eVLAN provides an index to a particular entry of the egress VLAN/eVLAN attribute table. In one embodiment, the egress VLAN/eVLAN attribute table is included in the attribute assignment unit 119.

Operation of the network device 100, according to an embodiment, will now be described in the context of a packet being processed by the network device 100. A packet is received via one of the ingress physical ports 108 and is processed by the port MAC receive unit 120 and the header decode unit 122.

The MAC2ME & TTI classification unit 124 assigns (performed by mapping unit 117) the source eport as the physical port 108 via which the packet was received. Additionally, the MAC2ME & TTI classification unit 124 assigns (performed by attribute assignment unit 119) one or more ingress eport attributes to the packet based on the assigned eport. Assigning the one or more ingress eport attributes comprises performing a lookup in the ingress port/eport attribute table using the assigned eport, in one embodiment.

Additionally, the MAC2ME & TTI classification unit 124 performs a TTI lookup. At least in some scenarios, the TTI lookup indicates that the eport is to be reassigned, and the MAC2ME & TTI classification unit 124 reassigns the eport (performed by mapping unit 117).

In one embodiment, if the eport is reassigned, the MAC2ME & TTI classification unit 124 assigns one or more ingress eport attributes to the packet based on the new eport (performed by attribute assignment unit 119). Assigning the one or more ingress eport attributes comprises performing a lookup in the ingress port/eport attribute table using the new eport, in one embodiment.

In at least some scenarios, the MAC2ME & TTI classification unit 124 assigns an eVLAN to the packet (performed by the eVLAN assignment unit 118). For example, if a DSA tag or the packet includes a VID (Virtual LAN Identifier), the MAC2ME & TTI classification unit 124 assigns an eVLAN based on the VID performed by the VLAN assignment unit 118), in an embodiment. As just one example, the MAC2ME & TTI classification unit 124 (performed by the VLAN assignment unit 118) sets the eVLAN to the VID. In one embodiment, the TTI lookup indicates that the eVLAN is to be assigned in at least some scenarios, and the MAC2ME & TTI classification unit 124 assigns (performed by the VLAN assignment unit 118) the eVLAN according to the TTI lookup.

The ingress policy engine 126 attaches or otherwise associates a flow identifier to/with the packet to indicate a flow to which the packet belongs, in an embodiment. The ingress policy engine 126 utilizes the eport and/or the eVLAN to determine the flow identifier and/or to take other actions. In some embodiments, the flow identifier and/or other actions determined based on the eport are considered ingress attributes based on the eport and/or the eVLAN. In some instances, the ingress policy engine 126 assigns an eVLAN to the packet, according to an embodiment. In one embodiment, the ingress policy engine 126 determines the eVLAN based on the eport. In some embodiments, ingress attributes based on the eVLAN are assigned to the packet by the ingress policy engine 126. For example, in some embodiments, the ingress policy engine 126 assigns one or more of the following attributes based on the eVLAN: an action to be taken when the source address of the packet is unknown to the network device 100, whether Layer-3 multicast and/or broadcast mirroring is enabled, whether and what type of eVLAN-based metering should be performed by the ingress policer engine unit 134, etc.

The bridge engine 130 makes a forwarding decision (e.g., assigns a target eport, eVLAN, and/or eVIDX) and assigns ingress attributes based on eport and/or eVLAN. For example, the bridge engine 130 assigns a target eport to which a packet is to be forwarded and assigns an attribute indicating whether the packet is to be mirrored to an ingress analyzer (not shown) based on the eport, in some scenarios. As another example, the bridge engine 130 assigns an eVIDX to a packet to indicate a list of eports to which a packet should be forwarded based on the eVLAN, in some scenarios.

The ingress policer engine 134 performs rate limiting, makes flow traffic measurements, and stores flow measurement information for a flow corresponding to the packet, according to an embodiment. In some embodiments, ingress eport attributes and/or ingress eVLAN attributes indicate which measurements should be made, whether sampling should be performed and how, whether time stamps should be applied, etc.

If the packet is to be transmitted to multiple eports, the Layer-2 replicator unit 138 creates one or more duplicates of the packet for forwarding to the set of one or more eports determined by the bridge engine 130. In an embodiment, the Layer-2 replicator unit 138 utilizes eVIDX as an index to the Layer-2 duplication table to determine the eports to which the packet is to be transmitted. Additionally, the duplication of the Layer-2 replicator unit 138 duplicates the packet. In one embodiment, an entry in the Layer-2 duplication table can be an indicator of a VIDX. In this embodiment, if an entry in Layer-2 duplication table is an indicator of a VIDX, the packet is additionally duplicated by the Layer-2 multicast replicator unit 144.

The pre-egress engine 140 determines one or more physical targets corresponding to the one or more target eports to which the packet is to be forwarded. A physical target could be a physical port/device pair, a trunk, a tunnel interface, etc. In an embodiment, the mapping unit 117 determines the one or more physical targets.

The egress filtering unit 142, the Layer-2 multicast replicator unit 144, the transmit queuing unit 146, and the scheduling unit 148 utilize egress eport attributes and egress eVLAN attributes to process the packet, including performing egress filtering, eport or eVLAN mirroring, egress spanning tree protocol based on eports, etc. In one embodiment, the egress port/eport attribute table is implemented in the transmit queuing unit 146. The egress port/eport attribute table indexed by the target eport. In an embodiment, the Layer-2 multicast replicator unit 144 utilizes the eVIDX as an index to a VIDX table to determine a set of physical ports to which the packet is to be duplicated, in some scenarios as will be discussed below in more detail. If a packet is assigned a VIDX, the Layer-2 multicast replicator unit 144 utilizes the VIDX as an index to the VIDX table to determine the set of physical ports to which the packet is to be duplicated.

If the packet is to have a VID added to the header, the header alteration unit 150 converts the eVLAN to a VID and adds the VID to the header. If an already existing VID included in the packet is to be modified, the header alteration unit 150 modifies the VID. In one embodiment, the header alteration unit 150 implements an egress physical port attribute table that includes attributes relevant only for the physical port. In this embodiment, the header alteration unit 150 indexes the egress physical port attribute table using the physical egress port number of the packet.

Figure 5:
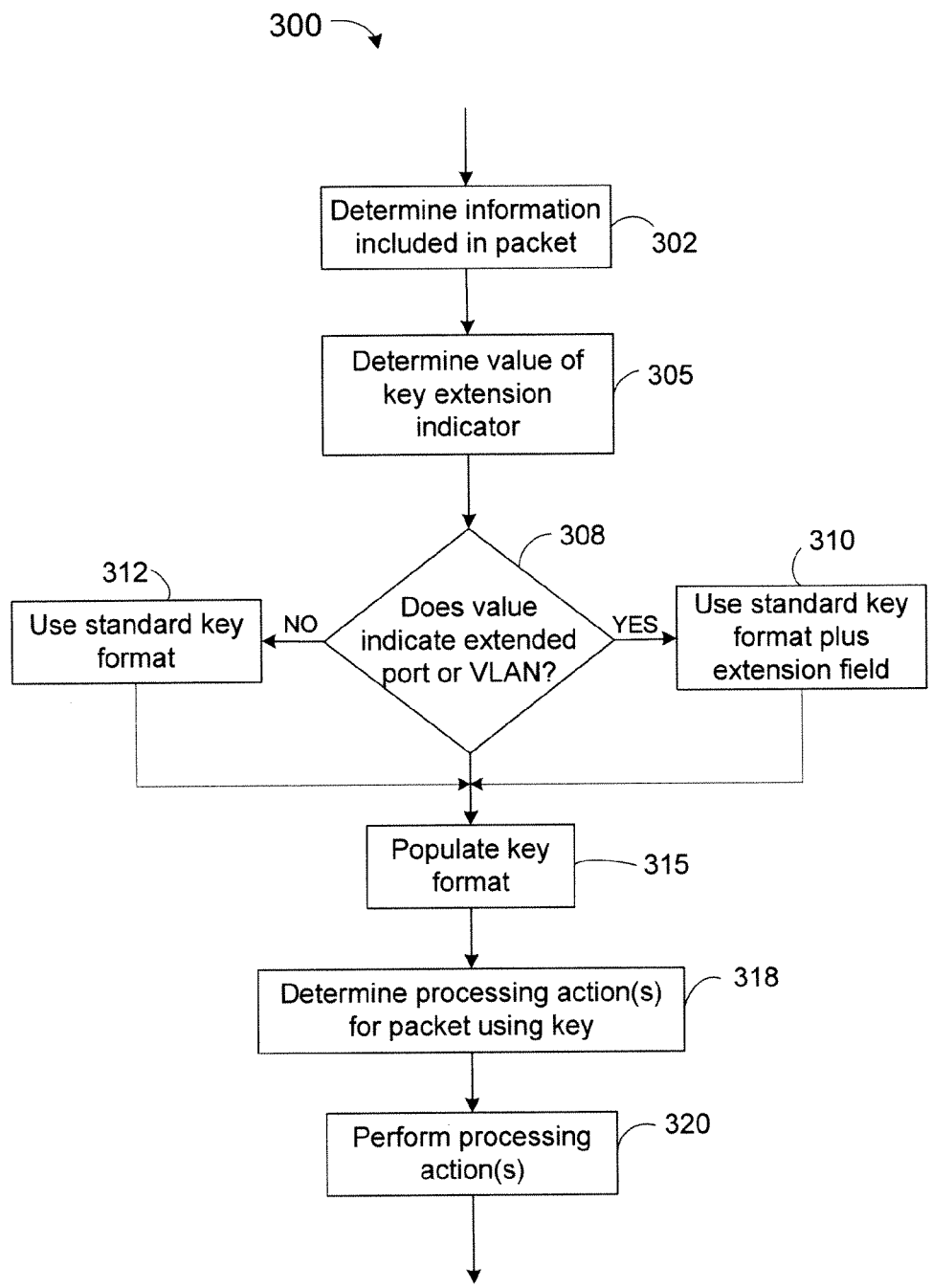
FIG. 5 is a flow diagram of an example method of processing packets in a network device, in accordance with an embodiment of the disclosure.

FIG. 5 is a flow diagram of an example method 300 of processing packets in a network device, in accordance with an embodiment of the disclosure. The method 300 is implemented in the network device 100 of FIG. 2, in an embodiment. However, in other embodiments, the method 300 is implemented by another suitable network device other than the network device 100. The method 300 is implemented by an ingress pipeline of a network device, by an egress pipeline of the network device, or by both the ingress and egress pipelines of the network device, in various embodiments.

At block 302, information included in the packet is determined, in an embodiment. For example, contents of one or more header fields of the packet are determined. The contents of the one or more header fields include, for example, a MAC destination address, a MAC source address, an Ethernet type, an port/eport identifier, a VLAN/eVLAN identifier, etc. In one embodiment, the header decoder block 122 and/or the MAC2ME & TTI Classification block 124 determine the information included in the packet.

At block 305, a value of a key extension indicator corresponding to the packet is determined. In an embodiment, at least a portion of the information included in the packet determined at the block 302 is used to determine the key extension indicator corresponding to the packet. In one embodiment, the key extension indicator is one of the plurality of key extension indicators 202a-202n included in an IPCL table, such as the IPCL table 200 of FIG. 3. In another embodiment, the key extension indicator is one of a plurality of key extension indicators in an EPCL table, such as the EPCL table 156 of FIG. 2. In other embodiments, the key extension indicator is not included in an IPCL table or in an EPCL table, but is included in another portion of memory that is accessible by the ingress and/or the egress pipeline, for example, in a globally accessible memory. The key extension indicator is a single bit, in an embodiment. The key extension indicator includes more than one bit, such as a byte or some other suitable number of bits, in other embodiments.

In some embodiments, one or more key extension indicators are included in a memory that is accessible by the network device. In an embodiment, each key extension indicator corresponds to a standard port, an eport, a standard VLAN or an eVLAN, such as shown in FIG. 2 where each key extension indicator corresponds to a different entry in the IPCL table 200 indexed by port/eport or by VLAN/eVLAN. In other embodiments, a particular key extension indicator corresponds to multiple entries in the IPCL table 200 or to a grouping of standard ports, eports, standard VLANs, and/or eVLANs. For example, a particular key extension indicator corresponds to all eports of a particular service class or priority. In another example, a particular key extension corresponds to a particular MAC destination address or to a particular MAC source address.

A value of the key extension indicator indicates whether a corresponding key format supports extended logical ports and/or eVLANs, i.e., whether the key format is an extended key format. For instance, a first value of the key extension indicator indicates that the key format is an extended key format (i.e., the key format supports extended ports and extended VLANs), and a second value of the key extension indicates that the key format is a standard key format (i.e., the key format supports standard ports and standard VLANs). In one example, a bit value of "1" corresponds to an extended key format, and a bit value of "0" corresponds to a standard key format.

At block 308, a determination is made as to whether the value of the key extension indicator indicates a standard key format or an extended key format. If, at block 308, the value of the key extension indicator indicates an extended key format (e.g., the key format supports or corresponds to an eport, eVLAN, etc.), the key format is determined (reference 310) to include a standard key format and an extension field, in an embodiment. For example, the key format includes one or more standard fields of a standard key format, and additionally includes the extension field. Typically, one of the one or more standard fields has a length equivalent to a length of a standard port identifier or of a standard VLAN identifier.

The extension field is appended to the end of the standard key format, in an embodiment. In other embodiments, the extension field is appended or inserted at some other location in the standard key format. In some embodiments, the extension field is a fixed-length field such as 26 bytes or some other suitable number of bytes. For example, the extension field is defined to be a fixed-length portion of a user-defined field or of selected user-defined bytes of a standard key format. In other embodiments, the extension field is defined to be of variable length.

If, at block 308, the value of the key extension indicator indicates a standard key format, the key format is determined (reference 312) to include one or more standard fields while excluding or omitting the extension field. Accordingly, the standard key format supports packets corresponding to legacy network devices.

At block 315, the key format is populated, in an embodiment. In one embodiment, the key format is populated based on at least a portion of the information included in the packet that was determined at the block 302. With regard to standard key formats, a standard field is populated with a standard port identifier or with a standard VLAN identifier that was determined based on the packet header, in an example. Other standard fields are populated based on information included in the packet header, in an embodiment. With regard to extended key formats, the eport identifier or the eVLAN identifier that was determined based on information included in the packet header (block 302) is distributively populated across one or more standard fields and the extension field, in some embodiments. In some embodiments, the extension field is populated with a tag, user-defined bytes, a user-defined subfield, or with other information.

At block 318, a processing action for the packet is determined based on the populated key. In an embodiment, the populated key is used to access a TCAM or other suitable memory to determine the processing action. In some embodiments, as the processing action is to be performed by some downstream entity in the pipeline, an attribute or flag associated with the packet is set to indicate the processing action, in an embodiment. In another embodiment, the processing action or indication thereof is stored in a portion of memory accessible to the pipeline. Processing actions include, for example, trapping the packet, forwarding the packet, mirroring the packet, sampling the packet, using the packet to calculate a statistic (e.g., a flow rate, a throughput, etc.), performing user defined processing actions, etc. In some embodiments, more than one processing action is determined at the block 318.

At block 320, the processing action is performed. In some embodiments, the processing action is performed based on the value of an attribute or flag set at the block 318. In some embodiments, the processing action is performed based on the indication of the processing action stored in the portion of memory at the block 318.

In some embodiments, the blocks 305-315 are performed by an ingress pipeline 104. In a particular embodiment, the blocks 305-315 are performed by an ingress policy engine 126 included in the ingress pipeline 104, in an embodiment. In some embodiments, the blocks 305-315 are performed by an egress pipeline 112. In a particular embodiment, the blocks 305-315 are performed by an egress policy engine 154, in an embodiment.

Figure 6:
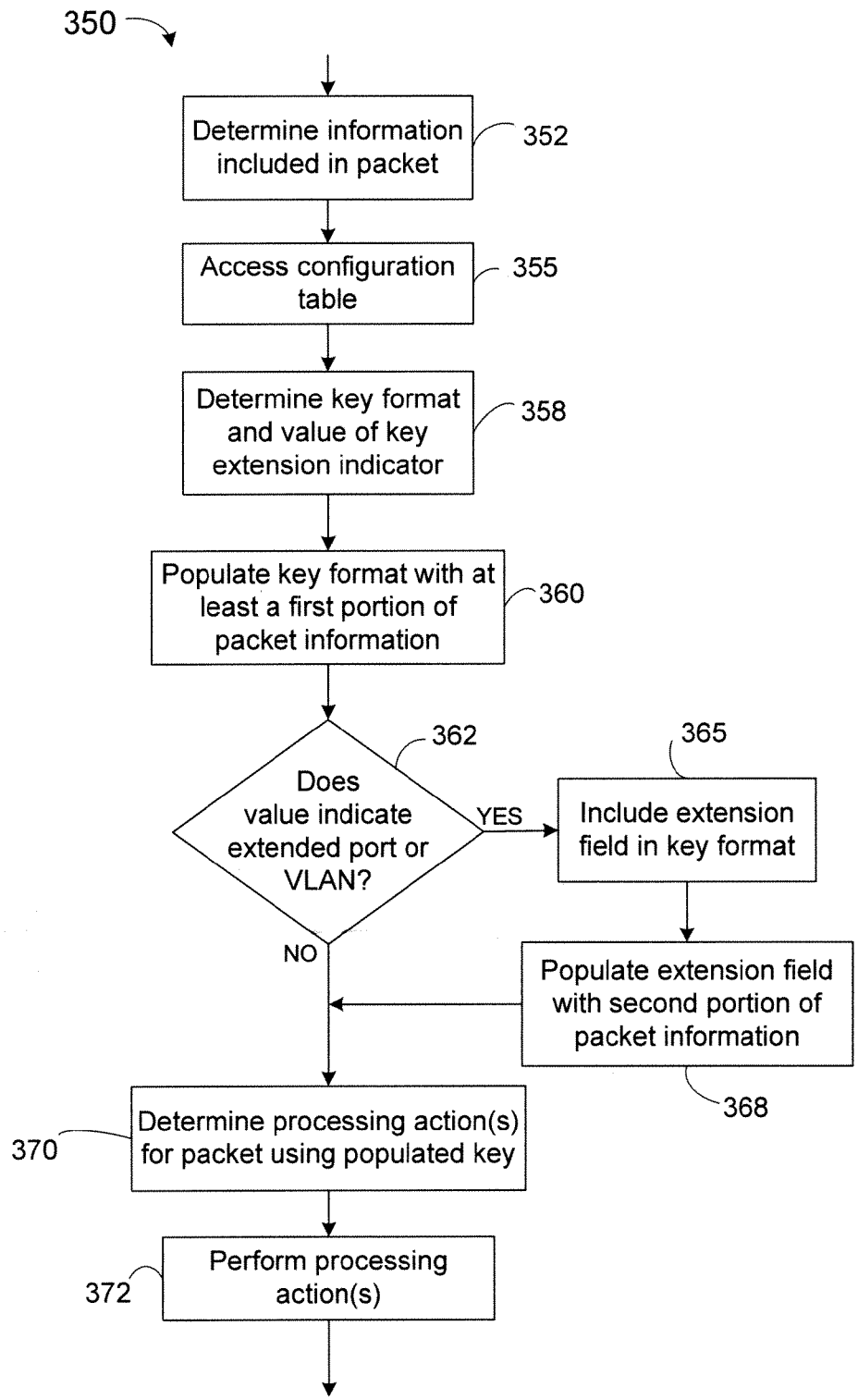
FIG. 6 is a flow diagram of another example method of processing packets in a network device, in accordance with an embodiment of the disclosure.

FIG. 6 is a flow diagram of another example method 350 of processing packets in a network device, in accordance with an embodiment of the disclosure. The method 350 is implemented in the network device 100 of FIG. 2, in an embodiment. However, in other embodiments, the method 350 is implemented by another suitable network device other than the network device 100. The method 350 is implemented by an ingress pipeline of a network device, by an egress pipeline of the network device, or by both the ingress and egress pipelines of the network device in various embodiments. In some embodiments, the method 300 and the method 350 are jointly performed.

At block 352, information included in the packet is determined. For example, contents of one or more header fields of the packet are determined, in an embodiment. The contents of the one or more header fields include, for example, a MAC destination address, a MAC source address, an Ethernet type, a port/eport identifier, a VLAN/eVLAN identifier, etc. In one embodiment, the header decoder block 122 and/or the MAC2ME & TTI Classification block 124 determine the information included in the packet.

At block 355, a configuration table or other suitable memory is accessed. The configuration or other suitable memory defines correspondences between ports/eports and key formats, and/or between VLANs/eVLANs and key formats. In an embodiment, the configuration table is an IPCL such as the IPCL table 128 of FIG. 2 or is an EPCL table such as the EPCL table 156 of FIG. 2. At least some of the information included in the packet that was determined at block 352 is used to access the configuration table or other suitable memory, in an embodiment. For example, the eport identifier is used as an index into the configuration table, or the eVLAN identifier is used as an index into the configuration table. Access to the configuration or suitable memory is based on other information included in the packet, in other examples.

At block 358, a key format and a value of a key extension indicator are determined from information stored in the configuration table or suitable memory. In an embodiment, the configuration table or suitable memory includes multiple entries whose indexes are based on at least some of the information included in the packet determined in the block 352. In one example, the eport identifier is used as an index into the configuration table. In another example, the eVLAN identifier is used as an index into the configuration table. Each entry in the configuration table includes a corresponding key format and a corresponding key extension indicator, in an embodiment.

In one embodiment, the key extension indicator is one of a plurality of key extension indicators 202a-202n included in the IPCL table 200 shown in FIG. 3. In another embodiment, the key extension indicator is one of a plurality of key extension indicators included in an EPCL table that is indexed based on eport or by eVLAN. In other embodiments, the key extension indicator is not included in an IPCL table or in an EPCL table, but instead is included in the other suitable memory locations, such as a globally accessible memory. The key extension indicator is a single bit, in an embodiment. The key extension indicator includes more than one bit (e.g., a byte or some other suitable number of bits) in other embodiments.

In an embodiment, each key extension indicator corresponds to one or more particular ports/eports or VLANs/eVLANs, such as shown in FIG. 3 where each key extension indicator corresponds to a different entry in the IPCL table 200 whose indexes are based on ports/eports or VLANs/eVLAN. In other embodiments, a particular key extension indicator corresponds to multiple entries in the IPCL table 200 or to a grouping of ports/eports or VLANs/eVLANs. For example, a particular key extension indicator corresponds to all eports of a particular service class or priority. In another example, a particular key extension corresponds to a MAC destination address or to a MAC source address.

A value of the key extension indicator indicates whether or not a corresponding key format supports extended logical ports and/or eVLANs, i.e., the key format is an extended key format. For instance, a first value of the key extension indicator indicates that the key format is an extended key format, and a second value of the key extension indicates that the key format is a standard key format, i.e., the key format supports standard ports and standard VLANs. In one example, a bit value of "1" corresponds to an extended key format, and a bit value of "0" corresponds to a standard key format.

At block 360, the key format is populated based on at least a first portion of the packet information obtained at the block 352. For example, if the packet ingressed via a standard port, the corresponding standard port identifier or the standard VLAN identifier is populated into one or more fields of the key format. In another example, if the packet is to be egressed via a non-standard or extended port, a portion of a corresponding non-standard or extended port identifier is populated into the key format, in an embodiment, as the non-standard or extended port identifier typically is of a greater length than a standard port identifier. For instance, a number of bits of the non-standard identifier equivalent to a length of the standard port identifier is populated into the key format.

Similarly, if the packet is to be egressed in a non-standard or extended VLAN (such as an eVLAN), a portion of a corresponding non-standard VLAN identifier is populated into the key format, in an embodiment, as the corresponding non-standard VLAN identifier typically is of a greater length than a standard port identifier. For instance, a number of bits of the non-standard VLAN identifier equivalent to a length of the standard VLAN identifier is populated into the key format.

At block 362, a determination is made as to whether the value of the key extension indicator indicates a standard key format or an extended key format. If, at block 362, the value of the key extension indicator indicates an extended key format (e.g., the key format supports or corresponds to an eport, eVLAN, etc.), the key format is determined (reference 365) to include a standard key format and an extension field, in an embodiment. For example, the key format includes one or more standard fields, and includes the extension field. In an embodiment, the one or more standard fields are of a length equivalent to a length of a standard port identifier or of a standard VLAN identifier. The extension field is appended to the end of the standard key format, in an embodiment. In other embodiments, the extension field is appended or inserted at some other location in the standard key format. In some embodiments, the extension field is a fixed-length field such as 26 bytes or some other suitable number of bytes. For example, the extension field is defined to be a fixed-length portion of a user-defined field or of selected user-defined bytes of a standard key format. In other embodiments, the extension field is defined to be of variable length.

At block 368, the extension field is populated with a second portion of the packet information. The extension field is populated with one or more bits (e.g., bits corresponding to the eport identifier or to the eVLAN identifier) that were excluded from the standard key format at the block 360, in an example. In another example, the extension field is populated with an entire remainder of bits from the eport identifier or the eVLAN identifier. In this manner, for extended key formats, the eport identifier or the eVLAN identifier determined from the packet header is distributively populated across the standard fields and the extension field, at least in some embodiments. In some embodiments, the extension field is additionally or alternatively populated with a tag, user-defined bytes, a user-defined subfield, or with other information.

If, at block 362, the value of the key extension indicator indicates a standard key format, the extension field is omitted from the key format. Accordingly, the key format for standard ports or standard VLANs supports packets corresponding to legacy network devices.

At block 370, a processing action for the packet is determined based on the populated key. In an embodiment, the populated key is used to access a TCAM or other suitable memory to determine the processing action. In some embodiments, as the processing action is to be performed by some downstream entity in the pipeline, an attribute or flag associated with the packet is set to indicate the processing action, in an embodiment. In another embodiment, the processing action or indication thereof is stored in a portion of memory accessible to the pipeline. Processing actions may include, for example, trapping the packet, forwarding the packet, mirroring the packet, sampling the packet, using the packet to calculate a statistic (e.g., a flow rate, a throughput, etc.), performing user defined processing actions, etc. In some embodiments, more than one processing action is determined at the block 318.

At block 372, the processing action is performed. In some embodiments, the processing action is performed based on the value of an attribute or flag set at the block 370. In some embodiments, the processing action is performed based on the indication of the processing action stored in the portion of memory at the block 370.

In some embodiments, the blocks 355-368 are performed by an ingress pipeline 104. In a particular embodiment, the blocks 355-368 are performed by an ingress policy engine 126 included in the ingress pipeline 104, in an embodiment. In some embodiments, the blocks 355-368 are performed by an egress pipeline 112. In a particular embodiment, the blocks 355-368 are performed by an egress policy engine 154, in an embodiment.

While the principles of the disclosure have been described above in connection with specific apparatuses and methods, it is to be clearly understood that this description is made only by way of example and not as limitation on the scope of the invention.

Additionally, at least some of the various blocks, operations, and techniques described above may be implemented in hardware, a processor or computer executing firmware and/or software instructions, or any combination thereof. When implemented at least partially by utilizing a processor executing software or firmware instructions, the executable software or firmware instructions may be stored in any non-transitory, tangible, computer readable or machine readable memory such as on a magnetic disk, an optical disk, or other tangible storage medium, in a RAM or ROM or flash memory, processor, hard disk drive, optical disk drive, tape drive, etc. The software or firmware instructions may include computer readable or machine readable instructions stored on a non-transitory, tangible memory of another one or more computer readable or machine readable storage medium that, when executed by the processor, cause the processor to perform various acts. When implemented in hardware, the hardware may comprise one or more of discrete components, an integrated circuit, an application-specific integrated circuit, etc.

What is claimed is:

1. A method of processing a packet in a network device, the method comprising:

determining a key corresponding to the packet based on information included in the packet and based on a value of a key extension indicator from a plurality of key extension indicators stored in a memory of the network device, each key extension indicator corresponding to at least one of i) a respective port of the network device or ii) a respective virtual domain, wherein determining the key corresponding to the packet includes:

determining that the key includes a standard field and an extension field when the value of the key extension indicator is a first value, and determining that the key includes the standard field and excludes the extension field when the value of the key extension indicator is a second value;

determining, based on the key, a processing action for the packet; and processing, by the network device, the packet using the processing action.

2. The method of claim 1, wherein the first value of the key extension indicator indicates at least one of an extended logical port or an extended virtual local area network (VLAN); and the method further comprises when the value of the key extension indicator is the first value:

populating the standard field of the key based on a first portion of the information included in the packet, the first portion corresponding to at least one of an extended logical port or an extended VLAN corresponding to the packet, and populating the extension field of the key based on a second portion of the information included in the packet, the second portion corresponding to the at least one of the extended logical port or the extended VLAN corresponding to the packet.

3. The method of claim 2, wherein populating the extension field of the key based on the second portion of the information comprises populating the extension field based on at least a portion of at least one of: a tag corresponding to the packet, an extended virtual local area network (e-VLAN) identifier corresponding to the packet, an extended logical port identifier corresponding to the packet, or a user-defined subfield.

4. The method of claim 1, wherein determining the key includes the standard field and the extension field comprises determining the key includes a fixed-length extension field.

5. The method of claim 1, wherein each key extension indicator corresponds to at least one respective port of the network device, and the method further comprises:

setting a value of the each key extension indicator to the first value when the at least one respective port of the network device corresponds to an extended logical port; and setting the value of the each key extension indicator to the second value when the at least one respective port of the network device does not correspond to any extended logical port.

6. The method of claim 1, wherein determining the key corresponding to the packet based on the value of the key extension indicator comprises determining the key corresponding to the packet based on a value of a single bit.

7. The method of claim 1, wherein:

determining the key based on the value of the key extension indicator stored in the memory of the network device comprises determining the key based on the value of the key extension indicator stored in a configuration table included in the network device, and determining the processing action based on the key comprises determining the processing action by using the key to access a ternary content-addressable memory (TCAM) included in the network device.

8. The method of claim 1, wherein determining the key and determining the processing action comprise determining the key and determining the processing action using a policy engine corresponding to one of an ingress pipeline of the network device or an egress pipeline of the network device.

9. A network device for processing packets, the network device comprising:

a plurality of physical ports; and a forwarding engine coupled to the plurality of physical ports, wherein the forwarding engine comprises:

a configuration table defining correspondences between at least one of i) ports and key formats, or ii) virtual domains and key formats; and a policy engine configured to:

determine, using the configuration table and based on information included in a packet that corresponds to at least one of a particular port or a particular virtual domain, a key format corresponding to the packet such that the key format includes a standard field and an extension field when a value of a key extension indicator stored in the configuration table is a first value, and the key format includes the standard field and excludes the extension field when the value of the key extension indicator is a second value, populate the key format based on the information included in the packet to form a key, and determine, based on the key, a processing action for the packet; and wherein the forwarding engine is configured to process the packet using the processing action.

10. The network device of claim 9, wherein the extension field is a fixed-length field.

11. The network device of claim 9, wherein the extension field of the key format is populated with at least one of a tag field corresponding to the packet, at least a portion of an extended virtual local area network (e-VLAN) identifier of the particular virtual domain corresponding to the packet, at least a portion of an extended logical port identifier of the particular port corresponding to the packet, or a user-defined subfield.

12. The network device of claim 9, wherein the configuration table includes a plurality of entries and each entry includes a respective key extension indicator and a respective key format, and wherein the policy engine is configured to select a particular entry of the configuration table based on the information included in the packet.

13. The network device of claim 12, wherein the configuration table includes the plurality of entries and the each entry includes the respective key extension indicator comprising a respective single bit.

14. The network device of claim 9, wherein:
the particular port is one of i) one of the plurality of physical ports, and ii) an extended logical port,
an identifier of the extended logical port is longer than an identifier of the one of the plurality of physical ports,
a number of extended logical ports is greater than a number of physical ports,
at least one physical port corresponds to more than one extended logical port,
the first value of the key extension indicator corresponds to at least one extended logical port, and
the second value of the key extension indicator does not correspond to any extended logical port.

15. The network device of claim 9, wherein:
the particular port is a particular extended logical port,
contents of the standard field corresponds to a first portion of the information included in the packet and corresponding to the particular extended logical port, and
contents of the extension field corresponds to a second portion of the information included in the packet and corresponding to the particular extended logical port.

16. The network device of claim 9, wherein the policy engine is included in at least one of i) an ingress processing unit of the network device, or ii) an egress processing unit of the network device.

17. The network device of claim 9, wherein the particular port is one of i) one of the plurality of physical ports, and ii) an extended logical port; and wherein an identifier of the extended logical port is longer than an identifier of the one physical port.

18. The network device of claim 9, wherein the policy engine is further configured to determine a processing action for the packet based on applying the key to a Ternary Content-Addressable memory (TCAM).

19. A method of processing packets in a network device, comprising:
accessing, using information included in a packet received by the network device, a configuration table;
determining, using the configuration table, a key format and a value of a key extension indicator corresponding to the information included in the packet;
populating a first field of the key format with at least a first portion of the information included the packet;
when the value of the key extension indicator corresponds to an extended logical port or to an extended virtual domain:
including an extension field in the key format, and
populating contents of the extension field of the key format with a second portion of the information included in the packet;
generating a key from the populated key format;
determining a processing action to be performed on the packet based on the key; and
performing the processing action on the packet.

20. The method of claim 19, wherein determining the processing action to be performed on the packet based on the key comprises accessing a ternary content-addressable memory using the key.

21. The method of claim 19, wherein determining the value of the key extension indicator comprises determining a value of a bit stored in the configuration table.

22. The method of claim 19, wherein populating the contents of the extension field with the second portion of the information included in the packet comprises populating the contents of the extension field with at least one of: i) a tag corresponding to the packet, ii) at least a portion of an extended virtual local area network (e-VLAN) identifier of a particular extended virtual domain corresponding to the packet, iii) at least a portion of an extended logical port identifier of a particular extended logical port corresponding to the packet, or iv) a user-defined subfield.

23. The method of claim 22, wherein including the extension field in the key format comprises defining the extension field to be a fixed-length portion of at least one user-definable field of the key format.

24. The method of claim 19, wherein each entry in the configuration table includes a corresponding key extension indicator, and the method further comprising for each corresponding key extension indicator:
when the each corresponding key extension indicator corresponds to any extended logical port, setting the value of the each corresponding key extension indicator in the configuration table to a first value; and
when the each corresponding key extension indicator corresponds to a physical port and does not correspond to the any extended logical port, setting the value of the each corresponding key extension indicator to a second value.

* * * * *